US009102054B2

(12) United States Patent  (10) Patent No.: US 9,102,054 B2
Okazaki                        (45) Date of Patent:     Aug. 11, 2015

(54) ROBOT, ROBOT CONTROL APPARATUS, ROBOT CONTROL METHOD, AND ROBOT CONTROL PROGRAM

(71) Applicant: PANASONIC INTELLECTUAL PROPERTY MANAGEMENT CO., LTD., Osaka (JP)

(72) Inventor: Yasunao Okazaki, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 70 days.

(21) Appl. No.: 14/134,470

(22) Filed: Dec. 19, 2013

(65) Prior Publication Data

US 2014/0107843 A1    Apr. 17, 2014

Related U.S. Application Data

(63) Continuation of application No. PCT/JP2013/003243, filed on May 21, 2013.

(30) Foreign Application Priority Data

May 23, 2012  (JP) ................................ 2012-117370

(51) Int. Cl.
*G05B 15/00*  (2006.01)
*B25J 9/16*   (2006.01)
(Continued)

(52) U.S. Cl.
CPC .............. *B25J 9/1612* (2013.01); *B25J 13/085* (2013.01); *B66C 23/005* (2013.01); *Y10S 901/02* (2013.01)

(58) Field of Classification Search
CPC .... B25J 9/1689; B25J 9/1633; B62D 57/032; A61B 2019/2223

IPC ...................................................... B25J 9/1689
See application file for complete search history.

(56) References Cited

U.S. PATENT DOCUMENTS 6,430,473 B1     8/2002  Lee et al.
2007/0120512 A1* 5/2007  Albu-Schaffer et al. ... 318/568.2
(Continued)

FOREIGN PATENT DOCUMENTS

JP    2001-113481    4/2001
JP    2007-38314     2/2007
(Continued)

OTHER PUBLICATIONS

International Search Report issued Aug. 13, 2013 in International (PCT) Application No. PCT/JP2013/003243.
(Continued)

*Primary Examiner* — Ian Jen
(74) *Attorney, Agent, or Firm* — Wenderoth, Lind & Ponack, L.L.P.

(57) ABSTRACT

Provided are a multi-joint robot arm, a manipulation force acquiring unit that acquires a manipulation force from a person, the manipulation force acquiring unit disposed on the multi-joint robot arm, an external force acquiring unit that acquires an external force to be applied to a gripped object, the external force acquiring unit disposed on the multi-joint robot arm, an impedance controller that performs impedance control on the multi-joint robot arm based on the manipulation force acquired by the manipulation force acquiring unit and a set impedance parameter, and an assist force correcting unit that corrects a force component vertical to the resistance force of an assist force generated by the impedance controller according to the resistance force generated by friction caused by contact between the gripped object and an external environment.

12 Claims, 17 Drawing Sheets

(51) Int. Cl.
   *B25J 13/08*     (2006.01)
   *B66C 23/00*     (2006.01)

(56) References Cited

U.S. PATENT DOCUMENTS

| | | | |
|---|---|---|---|
| 2009/0105880 A1* | 4/2009 | Okazaki | 700/258 |
| 2010/0087955 A1 | 4/2010 | Tsusaka et al. | |
| 2010/0216865 A1 | 8/2010 | Elias | |
| 2010/0262291 A1 | 10/2010 | Takesue et al. | |
| 2012/0010747 A1 | 1/2012 | Okazaki | |
| 2014/0379131 A1* | 12/2014 | Ryu et al. | 700/260 |

FOREIGN PATENT DOCUMENTS

| | | |
|---|---|---|
| JP | 2009-208170 | 9/2009 |
| WO | 2009/001550 | 12/2008 |
| WO | 2009/034962 | 3/2009 |
| WO | 2011/080856 | 7/2011 |

OTHER PUBLICATIONS

International Preliminary Report on Patentability and Written Opinion of the International Searching Authority issued Dec. 4, 2014 in International (PCT) Application No. PCT/JP2013/003243.

* cited by examiner

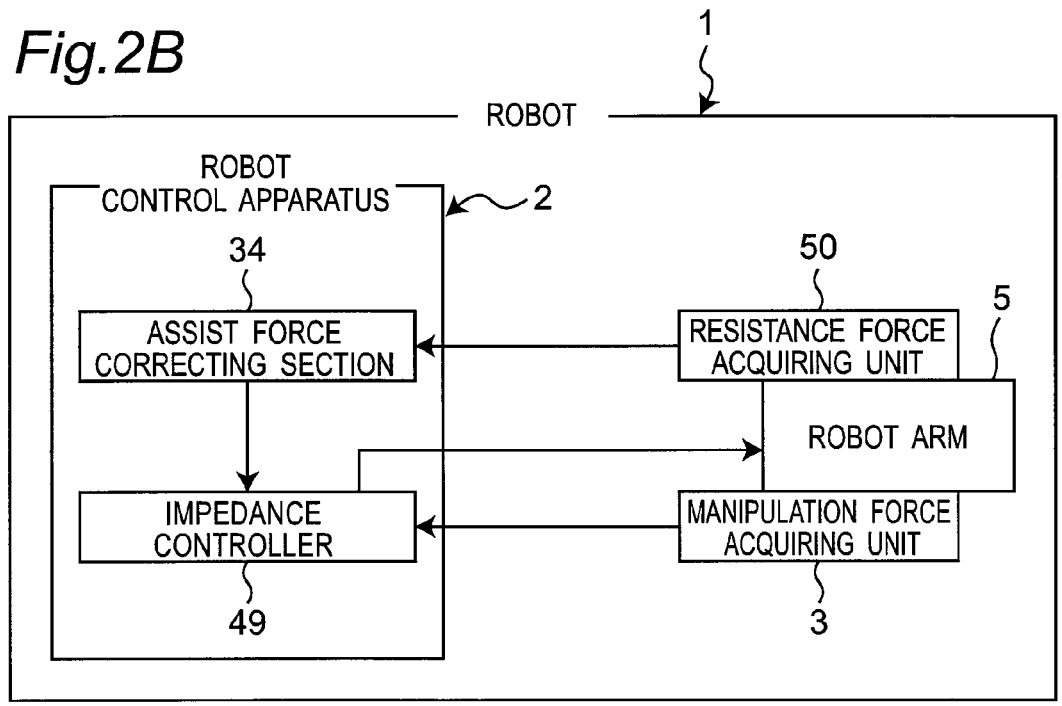
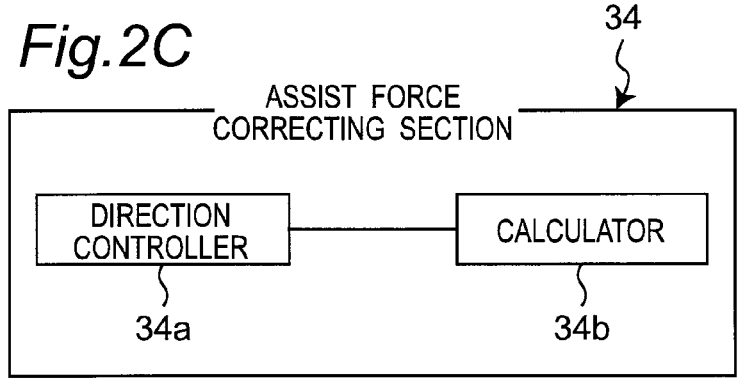

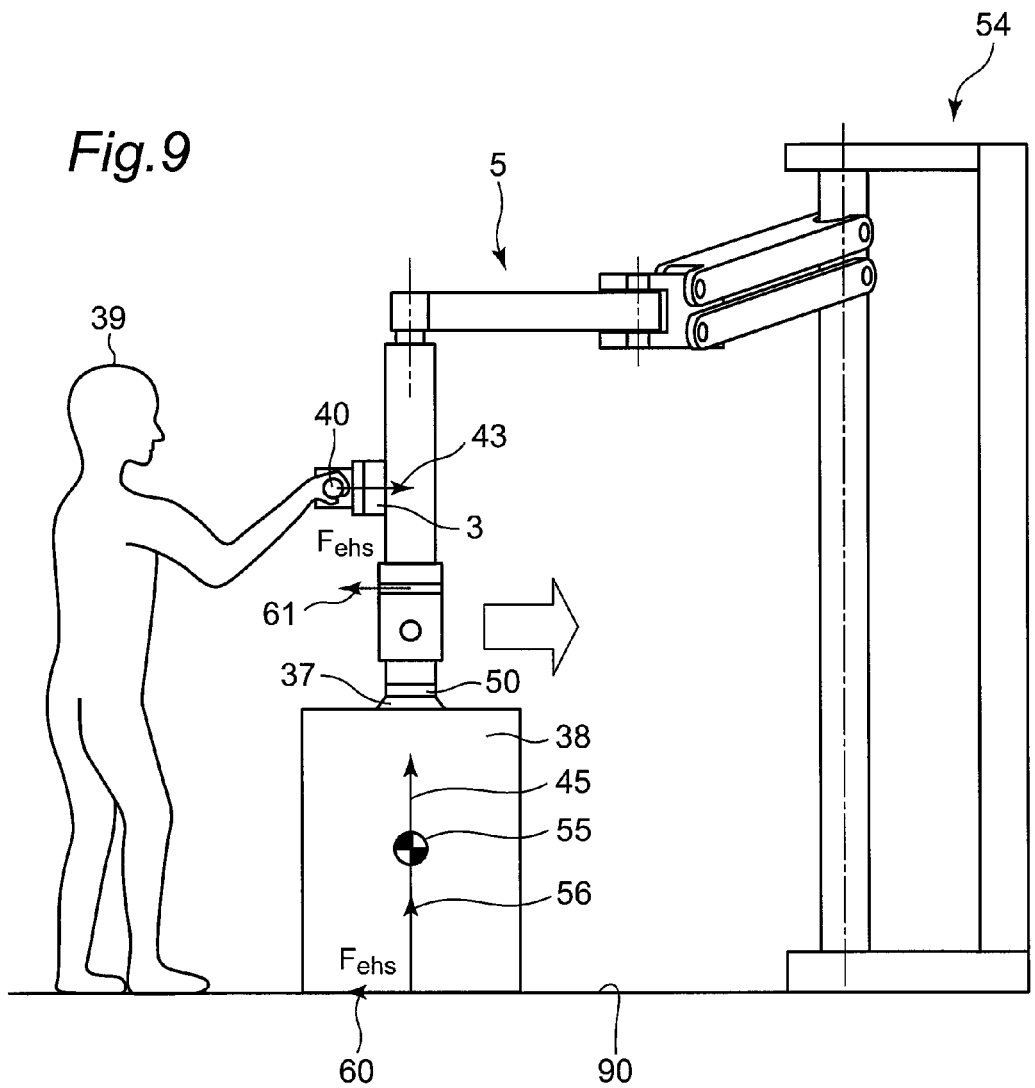

ROBOT, ROBOT CONTROL APPARATUS, ROBOT CONTROL METHOD, AND ROBOT CONTROL PROGRAM

CROSS-REFERENCE TO RELATED APPLICATIONS

This is a continuation application of International Application No. PCT/JP2013/003243, with an international filing date of May 21, 2013, which claims priority of Japanese Patent Application No.: 2012-117370 filed on May 23, 2012, the content of which is incorporated herein by reference.

TECHNICAL FIELD

The technical field relates to a robot, a robot control apparatus, a robot control method, and a robot control program for controlling a motion of conveying an object.

BACKGROUND ART

In recent years, domestic robots such as care robots or housework supporting robots are being actively developed. Further, as to industrial robots, robots that cooperate with people are being actively developed due to spread of cell production plant or the like.

As one example of robots that cooperate with people, there are proposed robots which are operated according to a manipulation force from a person by impedance control so as to realize power assist.

In a task that involves contact between a gripped object and an external environment in power assist robots that use impedance control, there is a problem that it is difficult for a person manipulating the robot to grasp the contact state.

In order to solve such a problem, Patent Literature 1 discloses a technique for detecting the contact between a gripped object and an external environment by a force sensor, and making control so that the detected external force acts upon a manipulating unit, so as to make the generated contact stable without vibration (see Patent Literature 1).

CITATION LIST

Patent Literature

Patent Literature 1: WO2009/034962 A1

SUMMARY OF THE INVENTION

In Patent Literature 1, however, only the stable contact is realized, and there is a problem that more complicated tasks such as rotation with the contact being maintained are not realized.

One non-limiting and exemplary embodiment provides a robot, a robot control apparatus, a robot control method, and a robot control program, each of which solves the conventional problem and can easily realize a task involving contact in a power assist robot using impedance control.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A control apparatus for a robot having a multi-joint robot arm, the control apparatus comprising:

a manipulation force acquiring unit disposed on the multi-joint robot arm, that acquires a manipulation force from a person;

a resistance force acquiring unit disposed on the multi-joint robot arm, that acquires a resistance force generated by friction caused by contact between a gripped object and an external environment when a motion of raising the gripped object is conducted with one side of the gripped object with respect to the external environment as a rotation center while the contact between the gripped object gripped by the multi-joint robot arm and the external environment is maintained;

an impedance controller that performs impedance control on the multi-joint robot arm based on the manipulation force acquired by the manipulation force acquiring unit and a set impedance parameter; and an assist force correcting unit that corrects a force component vertical to a horizontal component of the resistance force of an assist force generated by the impedance controller according to the resistance force acquired by the resistance force acquiring unit so that a friction force caused by the contact between the gripped object and the external environment does not exceed a maximum static friction force when the motion of raising the gripped object is conducted.

These general and specific aspects may be implemented using a system, a method, and a computer program, and any combination of systems, methods, and computer programs.

According to the robot, the robot control apparatus, the robot control method, and the robot control program according to the aspect of the present disclosure, an additional assist force is corrected into the corrected additional assist force by a correction vector of the assist force as a vector in a vertical direction based on an external force detected upon generation of the resistance force. For this reason, in the power assist robot using impedance control, the assist force is corrected from an actual assist force into an accurate assist force suitable for the task involving the contact so that the horizontal component of the resistance force or a component parallel to a wall surface is a desired resistance force vector, or a friction force caused by the contact between the gripped object and the external environment does not exceed the maximum static friction force. In this manner, the task involving the contact can be easily realized.

BRIEF DESCRIPTION OF THE DRAWINGS

These and other aspects and features of the present disclosure will become clear from the following description taken in conjunction with the embodiments thereof with reference to the accompanying drawings, in which:

FIG. 2B is a block diagram illustrating a schematic configuration of the robot arm control section for the robot according to the first embodiment;

FIG. 2C is a block diagram illustrating an assist force correcting section according to the first embodiment;

FIG. 9 is a view for describing a conveyance task according to a second embodiment;

DETAILED DESCRIPTION

Figure 1:
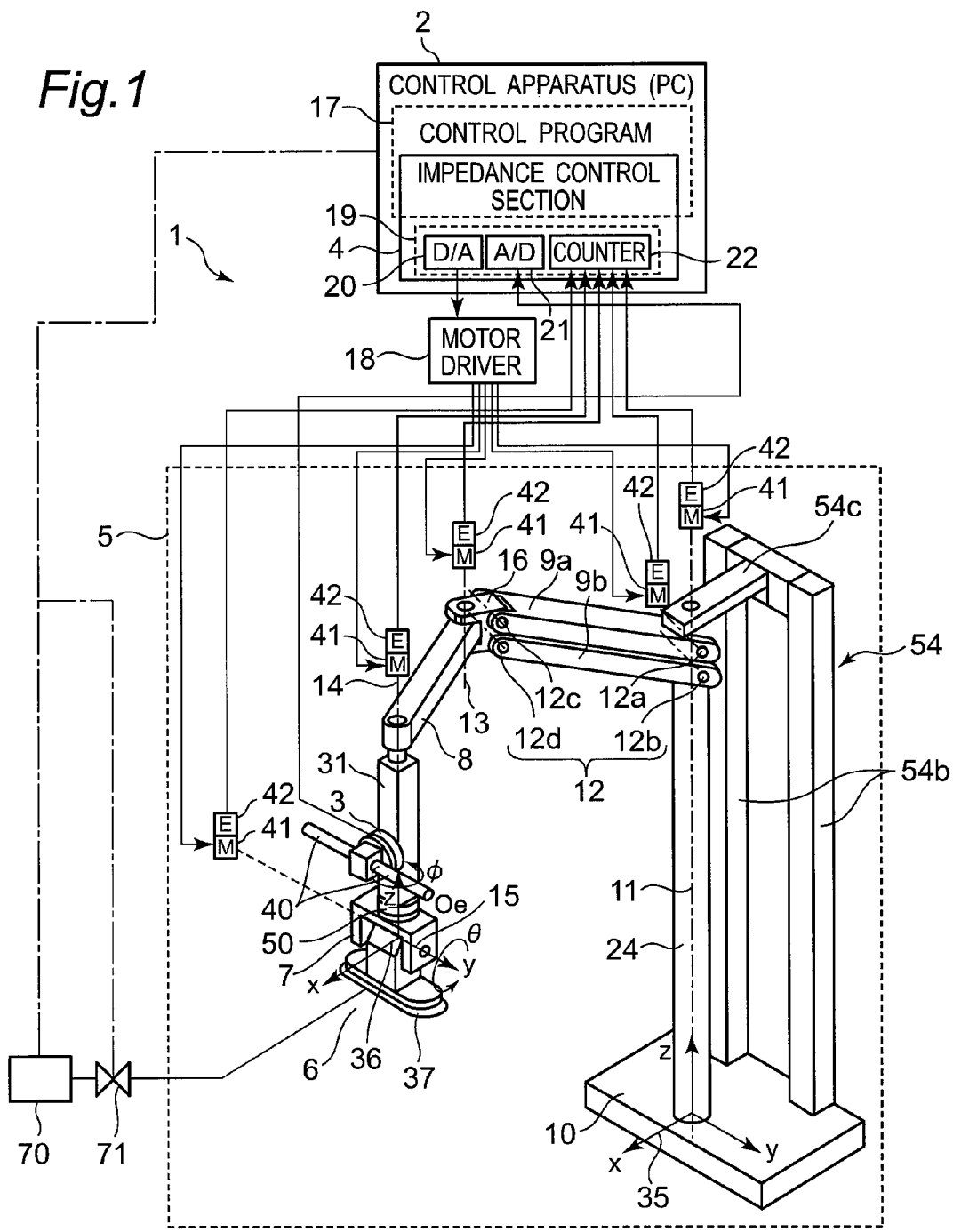
FIG. 1 is a view illustrating an overall configuration of a robot according to a first embodiment.

Examples of the disclosed technique are as follows.

1st aspect: A control apparatus for a robot having a multi-joint robot arm, the control apparatus comprising:

a manipulation force acquiring unit disposed on the multi-joint robot arm, that acquires a manipulation force from a person;

a resistance force acquiring unit disposed on the multi-joint robot arm, that acquires a resistance force generated by friction caused by contact between a gripped object and an external environment when a motion of raising the gripped object is conducted with one side of the gripped object with respect to the external environment as a rotation center while the contact between the gripped object gripped by the multi-joint robot arm and the external environment is maintained;

an impedance controller that performs impedance control on the multi-joint robot arm based on the manipulation force acquired by the manipulation force acquiring unit and a set impedance parameter; and an assist force correcting unit that corrects a force component vertical to a horizontal component of the resistance force of an assist force generated by the impedance controller according to the resistance force acquired by the resistance force acquiring unit so that a friction force caused by the contact between the gripped object and the external environment does not exceed a maximum static friction force when the motion of raising the gripped object is conducted.

According to the robot control apparatus according to the 1st aspect of the present disclosure, an additional assist force is corrected into the corrected additional assist force by a correction vector of the assist force as a vector in a vertical direction based on an external force detected upon generation of the resistance force. For this reason, in the power assist robot using impedance control, the assist force is corrected from an actual assist force into an accurate assist force suitable for the task involving the contact so that a friction force caused by the contact between the gripped object and the external environment does not exceed the maximum static friction force. In this manner, the task involving the contact can be easily realized.

2nd aspect: A control apparatus for a robot having a multi-joint robot arm, the control apparatus comprising:

a manipulation force acquiring unit disposed on the multi-joint robot arm, that acquires a manipulation force from a person;

a resistance force acquiring unit disposed on the multi-joint robot arm, that acquires a resistance force generated by friction caused by contact between a gripped object and an external environment when a normal force from the external environment is reduced and a motion of conveying the gripped object along a surface of the external environment is conducted so as to drag the gripped object in contact with the external environment while the contact between the gripped object gripped by the multi-joint robot arm and the external environment is maintained;

an impedance controller that performs impedance control on the multi-joint robot arm based on the manipulation force acquired by the manipulation force acquiring unit and a set impedance parameter; and an assist force correcting unit that corrects a force component vertical to a horizontal component of the resistance force or a component parallel to a wall surface of an assist force generated by the impedance controller according to the resistance force acquired by the resistance force acquiring unit, so that the horizontal component of the resistance force or the component parallel to the wall surface becomes a desired resistance force vector when the motion of dragging the gripped object is conducted.

According to the robot control apparatus according to the 2nd aspect of the present disclosure, an additional assist force is corrected into the corrected additional assist force by a correction vector of the assist force as a vector in a vertical direction based on an external force detected upon generation of the resistance force. For this reason, in the power assist robot using impedance control, the assist force is corrected from an actual assist force into an accurate assist force suitable for the task involving the contact so that the horizontal component of the resistance force or a component parallel to a wall surface is a desired resistance force vector. In this manner, the task involving the contact can be easily realized.

3rd aspect: The control apparatus for a robot according to the 1st aspect, wherein the assist force correcting unit comprises a direction controller that determines whether the force component vertical to the resistance force of the assist force is corrected in an increase direction or in a decrease direction according to a direction of the resistance force, and a calculator that determines a correcting amount of the force component vertical to the resistance force of the assist force in proportion to magnitude of the resistance force based on the direction determined by the direction controller.

In the control apparatus for a robot according to the 3rd aspect of the present disclosure, when the motion to raise the gripped object is conducted with a supporting point of contact between the gripped object and the external environment as the rotation center, a shift of the supporting point is prevented, and the raising motion can be easily realized.

4th aspect: The control apparatus for a robot according to the 2nd aspect, wherein the assist force correcting unit increases the force component vertical to the resistance force of the assist force generated by the impedance controller in proportion to magnitude of the resistance force.

In the control apparatus for a robot according to the 4th aspect of the present disclosure, even when a coefficient of kinetic friction during a conveyance motion fluctuates according to a position of the external environment, control for making the resistance force that acts between the gripped object and the external environment to be close to a set desired resistance force can be made by the assist force correcting unit and the impedance control unit.

5th aspect: The control apparatus for a robot according to the 2nd aspect, wherein the assist force correcting unit decreases the force component vertical to the resistance force of the assist force generated by the impedance controller in proportion to magnitude of the resistance force.

In the control apparatus for a robot according to the 5th aspect of the present disclosure, even when a coefficient of kinetic friction during a conveyance motion fluctuates according to a position of the external environment, control for making the resistance force that acts between the gripped object and the external environment to be close to a set desired resistance force can be made by the assist force correcting unit and the impedance control unit.

6th aspect: The control apparatus for a robot according to the 1st aspect, wherein the assist force correcting unit corrects a force from gravity compensation of the gripped object as the force component vertical to the resistance force of the assist force generated by the impedance controller.

In the control apparatus for a robot according to the 6th aspect of the present disclosure, even when a coefficient of kinetic friction during a conveyance motion fluctuates according to a position of the external environment, control for making the resistance force that acts between the gripped object and the external environment to be close to a set desired resistance force can be made by the assist force correcting unit and the impedance control unit.

7th aspect: The control apparatus for a robot according to the 5th aspect, wherein the assist force correcting unit corrects a force from force control for pressing the gripped object against the external environment as the force component vertical to the resistance force of the assist force generated by the impedance controller.

In the control apparatus for a robot according to the 7th aspect of the present disclosure, even when a coefficient of kinetic friction during a conveyance motion fluctuates according to a position of the external environment, control for making the resistance force that acts between the gripped object and the external environment to be close to a set desired resistance force can be made by the assist force correcting unit and the impedance control unit.

8th aspect: The control apparatus for a robot according to any one of the 1st to 7th aspects, wherein the resistance force acquiring unit is a force sensor disposed between an arm tip portion of the multi-joint robot arm and the gripped object gripped by the multi-joint robot arm.

In the control apparatus for a robot according to the 8th aspect of the present disclosure, the resistance force generated by the contact between the gripped object and the external environment can be measured easily and highly accurately.

9th aspect: The control apparatus for a robot according to any one of the 1st to 7th aspects, wherein the resistance force acquiring unit is an external force estimating unit that estimates a torque generated on a joint of the multi-joint robot arm as a torque estimation value to acquire a resistance force based on the torque estimation value and the manipulation force acquired by the manipulation force acquiring unit.

In the control apparatus for a robot according to the 9th aspect of the present disclosure, even when the resistance force acquiring unit such as an external force sensor is not provided, the resistance force estimating unit estimates a resistance force so that the task motions according to the resistance force can be conducted.

10th aspect: A robot comprising:
a multi-joint robot arm; and
the control apparatus according to any one of the 1st to 9th aspects, for controlling the robot.

According to the robot according to the 10th aspect of the present disclosure, an additional assist force is corrected into the corrected additional assist force by a correction vector of the assist force as a vector in a vertical direction based on an external force detected upon generation of the resistance force. For this reason, in the power assist robot using impedance control, the assist force is corrected from an actual assist force into an accurate assist force suitable for the task involving the contact so that the horizontal component of the resistance force or a component parallel to a wall surface is a desired resistance force vector, or a friction force caused by the contact between the gripped object and the external environment does not exceed the maximum static friction force. In this manner, the task involving the contact can be easily realized.

11th aspect: A control method for controlling a robot having a multi-joint robot arm, the control method comprising:
acquiring a manipulation force from a person by a manipulation force acquiring unit disposed on the multi-joint robot arm;
acquiring a resistance force generated by friction caused by contact between a gripped object and an external environment by a resistance force acquiring unit disposed on the multi-joint robot arm when a motion of raising the gripped object is conducted with one side of the gripped object with respect to the external environment as a rotation center while the contact between the gripped object gripped by the multi-joint robot arm and the external environment is maintained;
performing impedance control on the multi-joint robot arm by an impedance controller based on the manipulation force acquired by the manipulation force acquiring unit and a set impedance parameter; and
correcting, by an assist force correcting unit, a force component vertical to a horizontal component of the resistance force of an assist force generated by the impedance controller according to the resistance force acquired by the resistance force acquiring unit so that the friction force caused by the contact between the gripped object and the external environment does not exceed a maximum static friction force when the motion of raising the gripped object is conducted.

According to the robot control method according to the 11th aspect of the present disclosure, an additional assist force is corrected into the corrected additional assist force by a correction vector of the assist force as a vector in a vertical direction based on an external force detected upon generation of the resistance force. For this reason, in the power assist robot using impedance control, the assist force is corrected from an actual assist force into an accurate assist force suitable for the task involving the contact so that a friction force caused by the contact between the gripped object and the external environment does not exceed the maximum static friction force. In this manner, the task involving the contact can be easily realized.

12th aspect: A control program for a robot having a multi-joint robot arm, the control program causing a computer to function as:

an impedance controller that performs impedance control on the multi-joint robot arm based on a manipulation force from a person which is acquired by a manipulation force acquiring unit disposed on the multi-joint robot arm and a set impedance parameter;

a resistance force acquiring unit disposed on the multi-joint robot arm, that acquires a resistance force generated by friction caused by contact between a gripped object and an external environment when a motion of raising the gripped object is conducted with one side of the gripped object with respect to the external environment as a rotation center while the contact between the gripped object gripped by the multi-joint robot arm and the external environment is maintained; and an assist force correcting unit that corrects a force component vertical to a horizontal component of the resistance force of an assist force generated by the impedance controller according to the resistance force so that the friction force caused by the contact between the gripped object and the external environment does not exceed a maximum static friction force when the motion of raising the gripped object is conducted.

According to the robot control program according to the 12th aspect of the present disclosure, an additional assist force is corrected into the corrected additional assist force by a correction vector of the assist force as a vector in a vertical direction based on an external force detected upon generation of the resistance force. For this reason, in the power assist robot using impedance control, the assist force is corrected from an actual assist force into an accurate assist force suitable for the task involving the contact so that a friction force caused by the contact between the gripped object and the external environment does not exceed the maximum static friction force. In this manner, the task involving the contact can be easily realized.

First Embodiment

FIG. 1 illustrates a configuration of a robot 1 according to a first embodiment of the present disclosure. The robot 1 includes a multi-joint robot arm 5, and a control apparatus 2 for the robot 1 that controls a motion of the multi-joint robot arm 5.

The control apparatus 2 is configured by a general personal computer in hardware. Further, the control apparatus 2 except for an input/output IF 19 of the robot arm control section (robot arm controller) 4 is realized in software as a control program 17 executed by a personal computer. Therefore, for example, a computer program having steps constituting respective motions is stored readably in a recording medium such as a memory device (hard disc or the like), and the computer program is loaded into a temporary memory device (semiconductor memory or the like) of the computer so as to be run using a CPU and enable the respective steps to be executed.

The input/output IF 19 includes a D/A board 20, an A/D board 21, and a counter board 22, each being connected to an extension slot such as a PCI bus of the personal computer.

Execution of the control program 17 for controlling the motion of the multi-joint robot arm 5 of the robot 1 enables the control apparatus 2 to function.

Joint angle information output from joint angle sensors or respective encoders 42 as one example of a position information acquiring section for respective joints (first to fourth joints) 11, 12 (12a, 12b, 12c, 12d), 13, and 14 of the robot arm 5 are taken into the control apparatus 2 via the counter board 22. The control apparatus 2 calculates control command values for the rotary motions about joint shafts of the joints 11, 12, 13, and 14 based on the acquired joint angle information. The calculated control command values are provided to a motor driver 18 through the D/A board 20, and motors 41 of joints 11, 12, 13, and 14 of the robot arm 5 are respectively driven according to the control command values sent from the motor driver 18. The position information acquiring section has a function for acquiring time series information about the position of the robot arm 5.

The robot arm 5 is a multi-link manipulator with four degrees of freedom, and is configured to include a hand (which serves as one example of the arm tip portion of the multi-joint robot arm 5) 6 for gripping an object, a hanging link 31, a front arm link 8, an elbow block 16, a pair of upper arm links 9a and 9b, a first joint pillar 24, and a pedestal 10.

The hanging link 31 is connected to the front arm link 8 rotatably about the joint shaft of the fourth joint 14. A hand 6 is attached to a distal end of the hanging link 31.

A proximal end of the front arm link 8 is coupled to one end of the elbow block 16 rotatably about the joint shaft of the third joint 13.

The pair of upper arm links 9a and 9b have a parallel link structure, in which one ends of the upper arm links 9a and 9b are connected to the other end of the elbow block 16, so as to be rotatable about the joint shafts of the two joints 12c and 12d of the second joint 12.

The first joint pillar 24 is supported by the pedestal 10 and a support member 54 so as to be located along the top-bottom direction and to be rotatable about the joint shaft of the first joint 11. The other ends of the upper arm links 9a and 9b are connected to the part near the upper end of the first joint pillar 24 so as to be rotatable about the joint shafts of the two joints 12a and 12b of the second joint 12. Specifically, the lower end of the first joint pillar 24 is supported at the pedestal 10 so as to be rotatable about the joint shaft of the first joint 11. The upper end of the first joint pillar 24 is supported at an upper end support portion 54c of the support member 54 projecting from the upper end of the support portion 54b of the support member 54 provided upright at the pedestal 10, so as to be rotatable about the joint shaft of the first joint 11.

The elbow block 16 rotates about the second joint 12a and the second joint 12b such that the joint shaft of the third joint 13 is constantly maintained to be in parallel to the joint shaft of the first joint 11 by the rotation about the joint shafts of the second joints 12 (12a, 12b, 12c, and 12d).

With this configuration, the robot arm 5 constitutes the multi-link manipulator of four degrees of freedom, in which the rotation about a total of four axes is enabled.

An external force sensor (force sensor) 50 is attached to the arm tip of the robot arm 5, and the hand 6 is attached beyond the sensor 50. The external force sensor 50 can measure an external force $F_{es}$ to be applied to the hand 6, and outputs the external force $F_{es}$ as the measured value to (an assist force correcting section 34 of) an impedance control section 4. The hand 6 has a structure in which a C-shaped wrist base 7 and a suction pad 37 are connected by a wrist joint 15. The suction pad 37 can relatively rotate about the joint shaft of the wrist joint 15 with respect to the wrist base 7 as indicated by an arrow θ. The suction pad 37 performs suction by a suction motion of a vacuum pump 70 and an opening motion of an on-off valve 71, and sucks the surface of an object 38 so as to grip the object. A closing motion of the on-off valve 71 cancels the suction, so that the suction pad 37 can be removed from the surface of the object. The opening/closing motions of the vacuum pump 70 and the on-off valve 71 are controlled by the control apparatus 2.

The joints 11, 12, 13, and 14 constituting the rotary portions of respective shafts are each provided with a rotation driving device (the motor 41 in the first embodiment) provided at one member of each of the joints 11, 12, 13, and 14, and the encoder 42 for detecting a rotation phase angle (i.e., a joint angle) of the rotating shaft of the motor 41. When the rotating shaft of the motor 41 is coupled with the other member of the joint and is caused to rotate positively and negatively, the other member can be rotated about each of the joint shafts with respect to the one member. The rotation driving device is controlled by the motor driver 18, as described later. In the first embodiment, the motor 41 serving as one example of the rotation driving device and the encoder 42 are arranged in each of the joints 11, 12, 13, and 14 of the robot arm 5.

Reference numeral 35 in FIG. 1 denotes an absolute coordinate system in which a relative positional relationship with respect to the pedestal 10 is fixed. Reference numeral 36 denotes an arm tip coordinate system in which a relative positional relationship with respect to the hand 6 is fixed. An origin position $O_e$ (x, y, z) of the arm tip coordinate system 36 viewed from the absolute coordinate system 35 is defined as a hand position of the robot arm 5, an orientation φ of the arm tip coordinate system 36 viewed from the absolute coordinate system 35 is defined as a hand orientation of the hand 6 of the robot arm 5, and a hand position and orientation vector r of the hand 6 is defined as $r=[x, y, z, \phi]^T$. In a strict sense, the position and orientation vector r is such that the time series information (time function) $r(t)=[x(t), y(t), z(t), \phi(t)]^T$, and first-order differentiation can provide velocity information, and second-order differentiation can provide acceleration information.

In the first embodiment, the encoder 42 is used as one example of the position information acquiring section for acquiring the time series information about the position of the robot arm 5. In this case, the encoder 42 is used as one example of the position information acquiring section since signals sensed by the encoder 42 are primary information about a position. Therefore, the robot arm control section 4 may carry out first-order differentiation on the position information acquired by the position information acquiring section to acquire velocity information, and may carry out second-order differentiation to acquire acceleration information. Further, when the position information acquiring section is used as a section for acquiring not only the time series information about the position of the robot arm 5 but also the velocity information or the acceleration information, this section may be considered as one means that carries out the sensing in the encoder 42, the taking into the robot arm control section 4 by the counter board 22, the conversion into a joint angle q by the control program, and the conversion into the position and orientation by a forward kinematics calculating section 26.

When the hand position and orientation of the hand 6 of the robot arm 5 are controlled, the hand position and orientation vector r is caused to follow the hand position and orientation desired vector $r_d$.

A manipulation handle 40 has a bar-shaped structure in which the manipulation handle 40 is connected to the hanging link 31 via a manipulation force sensor 3 and one end of the manipulation handle 40 is fixed to the center part of the manipulation force sensor 3. A person 39 directly grips a pair of handle portions of the manipulation handle 40 directly with both hands, and applies a force thereto so as to be able to manipulate the robot arm 5. The manipulation force sensor 3 is disposed between the manipulation handle 40 and the robot arm 5. A manipulation force $F_{ms}$ generated by the manipulation of the person 39 is detected by the manipulation force sensor 3, and can be output to a below-described force transformation section (force transformation unit) 30. The manipulation force sensor 3 functions as one example of a manipulation force acquiring unit.

Details of the robot arm control section 4 are described below with reference to FIG. 2A.

The robot arm control section 4 includes a desired trajectory generating section (desired trajectory generator) 23, a first calculator (corrected desired trajectory calculating unit) 51, a position error calculating unit 52, a position error compensating section (position error compensating unit) 27, a dynamics control section (dynamics controller) 28, a desired torque calculating unit 53, a torque control section (torque controller) 48, an impedance calculating section (impedance calculating unit) 25, the force transformation section (force transformation unit) 30, the assist force correcting section (assist force correcting unit) 34, and the forward kinematics calculating section (forward kinematics calculating unit) 26.

Figure 2A:
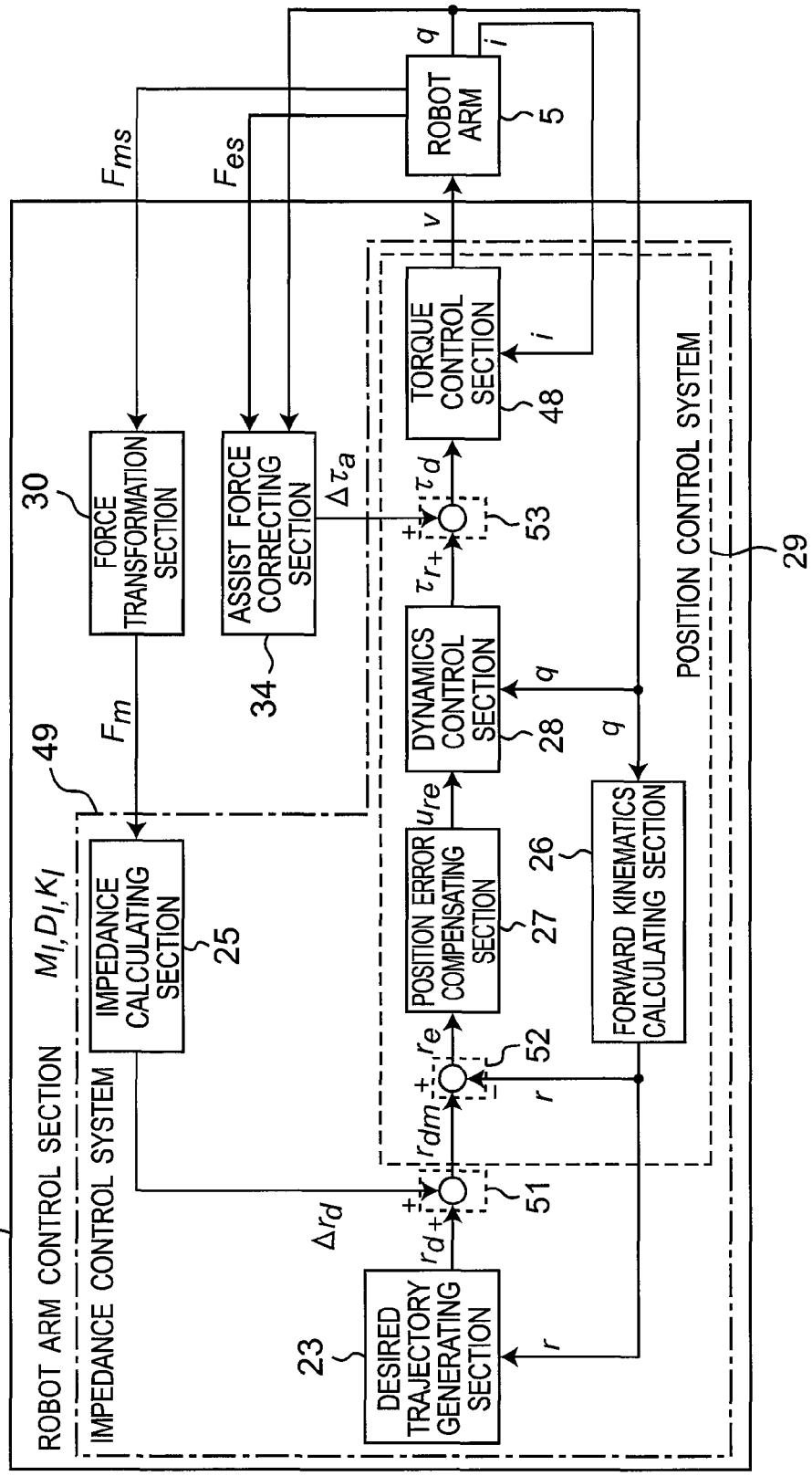
FIG. 2A is a block diagram illustrating a robot arm control section for the robot according to the first embodiment.

In FIG. 2A, reference numeral 5 denotes the robot arm shown in FIG. 1. A present value (joint angle vector) $q=[q_1, q_2, q_3, q_4, q_5]^T$ of the joint angle measured by the encoder 42 of the joint shaft of each joint is output from the robot arm 5, and is taken into (the assist force correcting section 34 of) the impedance control section 4 by the counter board 22. Here, $q_1, q_2, q_3, q_4$, and $q_5$ are the joint angles of the first joint 11, the second joint 12a, the third joint 13, the fourth joint 14, and the fifth joint 15, respectively.

Further, an external force (measured value) $F_{ms}=[f_x, f_y, f_z, n_x, n_y, n_z]^T$ measured by the force sensor 3 is output from the force sensor 3 of the robot arm 5, and is taken into (the force transformation section 30 of) the impedance control section 4 by the A/D board 21. Here, $f_x, f_y$, and $f_z$ are components of the force in respective three directions (x-axis, y-axis, and z-axis directions) perpendicular to each other in the arm tip coordinate system 36. Further, $n_x, n_y$, and $n_z$ are rotation moments about the three directions perpendicular to each other in the arm tip coordinate system 36.

The desired trajectory generating section (desired trajectory generator) 23 outputs to the first calculator 51a hand position and orientation desired vector $r_d$ for realizing the desired motion of the robot arm 5. In the desired motion of the robot arm 5, positions $(r_{d0}, r_{d1}, r_{d2}, \ldots)$ at respective points at times $(t=0, t=t_1, t=t_2, \ldots)$ are provided as time series data in advance according to the objective task. The desired trajectory generating section 23 interpolates the trajectories between the respective points using polynomial interpolation, and generates the hand position and orientation desired vector $r_d$.

The impedance calculating section (impedance calculating unit) 25 is a portion that provides the robot arm 5 with the function for realizing control over the values of the mechanical impedance of the robot arm 5 to mechanical impedance set values. The impedance calculating section 25 outputs 0 when the robot arm 5 independently moves by position control along the desired trajectory generated by the desired trajectory generating section 23 based on the transformed manipulation force $F_m$ input from the force transformation section 30 as described later. On the other hand, when the robot arm 5 and a person conduct cooperation tasks, the impedance calculating section 25 calculates a hand position and orientation desired corrected output $\Delta_{rd}$ for allowing the robot arm 5 to realize mechanical impedance using set impedance parameters $M_I, D_I$, and $K_I$ (inertia $M_I$, damping $D_I$, and stiffness $K_I$) and the transformed manipulation force $F_m$ transformed by the force transformation section 30 based on the external force $F_{ms}=[f_x, f_y, f_z, n_\phi]^T$ to be input from the force sensor 3 into the force transformation section (force transformation unit) 30 as described later, using the following Equation (1), and outputs the calculated output $\Delta_{rd}$ to the first calculator 51.

The hand position and orientation desired corrected output $\Delta r_d$ output from the impedance calculating section 25 is added to the hand position and orientation desired $r_d$ output from the desired trajectory generating section 23 by the first calculator 51, and thus, the hand position and orientation corrected desired vector $r_{dm}$ is generated by the first calculator 51. The hand position and orientation corrected desired vector $r_{dm}$ is input from the first calculator 51 into the position error calculating unit 52. Here, $n_\varphi$ is a rotation moment about the fourth joint shaft.

$$\Delta r_d = (s^2 M_I + s D_I + K_I)^{-1} F_m \qquad (1)$$

Here, $$M_I = \begin{bmatrix} M_I & 0 & 0 & 0 \\ 0 & M_I & 0 & 0 \\ 0 & 0 & M_I & 0 \\ 0 & 0 & 0 & M_I \end{bmatrix} \qquad (2)$$

$$D_I = \begin{bmatrix} D_I & 0 & 0 & 0 \\ 0 & D_I & 0 & 0 \\ 0 & 0 & D_I & 0 \\ 0 & 0 & 0 & D_I \end{bmatrix} \qquad (3)$$

$$K_I = \begin{bmatrix} K_I & 0 & 0 & 0 \\ 0 & K_I & 0 & 0 \\ 0 & 0 & K_I & 0 \\ 0 & 0 & 0 & K_I \end{bmatrix} \qquad (4)$$

and s is a Laplacian operator.

The forward kinematics calculating section (forward kinematics calculating unit) 26 receives the joint angle vector q being the current value q of each joint angle output from the encoder 42 of each joint shaft of the robot arm 5 through the counter board 22. The forward kinematics calculating section 26 geometrically calculates the conversion from the joint angle vector q of the robot arm 5 to the hand position and orientation vector r. The hand position and orientation vector r is input from the forward kinematics calculating section 26 into the desired trajectory generating section 23 and the position error calculating unit 52.

The position error calculating unit 52 obtains an error $r_e$ between the hand position and orientation vector r calculated by the forward kinematics calculating section 26, and the hand position and orientation corrected desired vector $r_{dm}$ generated by the first calculator 51, and outputs the obtained error $r_e$ to the position error compensating section (position error compensating unit) 27.

The position error compensating section 27 obtains a position error compensation output $u_{re}$ based on the error $r_e$ obtained by the position error calculating unit 52, and outputs the obtained position error compensation output $u_{re}$ to the dynamics control section 28.

The dynamics control section 28 calculates a hand position error compensation torque $\tau_r$ for compensating a hand position error of the robot arm 5 using the joint angle vector q from the encoder 42, the position error compensation output $u_{re}$ from the position error compensating section 27, and Equation (5) based on an equation of motion of the robot arm 5, namely, $$\tau_r = M(q) J_r^-(q)[-\dot{J}_r(q)\dot{q} + u_{re}] + h(q,\dot{q}) + g(q) \qquad (5)$$

and outputs the calculated torque $\tau_r$ to the desired torque calculating unit 53. Dynamics information such as weight information and inertia information about the gripped object 38 and weight information and inertia information about the robot arm 5 are stored in a database of the dynamics control section 28 in advance, and the weight of the gripped object 38 is compensated.

Here, M(q) is inertia matrix (inertia force term), $$h(q,\dot{q}) \qquad (6)$$

is a centrifugal force and Coriolis force term, and g(q) is a gravity term. These terms are dynamics parameters composed of each link structure constituting the robot arm 5, the weight of the object 38 gripped by the hand 6, an inertia moment, and the like. The centrifugal force and Coriolis force term is arbitrary, and thus at least the inertia matrix (inertia force term) and the gravity term compose the dynamics parameters. Further, $J_r(q)$ is a Jacobian matrix that satisfies Equation (7), namely, the following relationship, $$\dot{r} = J_r(q)\dot{q} \qquad (7)$$

Further, the gravity term g(q) is a sum of a gravity term $g_a(q)$ of the robot arm 5 and a gravity term $g_o(q)$ of the object 38.

The assist force correcting section 34 calculates an assist force correction torque $\Delta\tau_a$ based on the joint angle vector q from the encoder 42 and the external force $F_{es}$ detected by the external force sensor 50 using $$\Delta\tau_a = \Delta g(q, F_{ehs}) \qquad (8)$$

Here, $\Delta g(q, F_{ehs})$ is a gravity compensation correction torque, and $F_{ehs}$ is a horizontal component in the external force detected by the external force sensor 50, and is equal to a resistance force 60. The calculated assist force correction torque $\Delta\tau_a$ is input into the desired torque calculating unit 53.

The desired torque calculating unit 53 adds the hand position error compensation torque $\tau_r$ obtained by the dynamics control section 28 and the assist force correction torque $\Delta\tau_a$ obtained by the assist force correcting section 34, so as to obtain a desired torque $\tau_d$. The desired torque $\tau_d$ is input from the desired torque calculating unit 53 into the torque control section 48.

The torque control section 48 receives the desired torque $\tau_d$ obtained by the desired torque calculating unit 53, and calculates a voltage command value v for the motor driver 18 based on the desired torque $\tau_d$ and a current i flowing in the motor 41 detected by the motor driver 18 for driving each joint using Equation (9), namely, $$v = K_\tau(\tau_d - K_M i) \qquad (9)$$

Here, $K_\tau$ is a gain of the torque control, and $K_M$ is a torque constant.

The voltage command value v is provided as the voltage command value from the torque control section 48 to the motor driver 18 via the D/A board 20. The motor driver 18 drives each of the motors 41 based on the voltage command value v, and drives to positively and negatively rotate each of the joint shafts so as to operate the robot arm 5.

A description will be given of a basic principle of the motions as to the basic configuration of the robot arm control section 4 configured as above.

The basic motion is feedback control (position control) of the hand position and orientation error $r_e$ performed by the position error compensating section 27, and a portion surrounded by a dotted line in FIG. 2A indicates a position control system 29. That is, the position control system 29 includes the position error calculating unit 52, the position error compensating section 27, the dynamics control section 28, the desired torque calculating unit 53, and the torque control section 48.

For example, when a PID compensator is used as the position error compensating section 27, control is performed so that the hand position and orientation error $r_e$ converges to 0, and the desired impedance control motion of the robot arm 5 can be realized.

When the impedance control is performed, in the above-described position control system 29, the hand position and orientation desired corrected output $\Delta r_d$ is output from the impedance calculating section 25 and is added to the hand position and orientation desired vector $r_d$ output from the desired trajectory generating section 23 by the first calculator 51, so that the hand position and orientation desired value is corrected. The corrected hand position and orientation desired value is input as the hand position and orientation corrected desired vector $r_{dm}$ into the position control system 29. Therefore, in the position control system 29, the hand position and orientation desired value slightly deviates from the original value, and consequently the mechanical impedance is realized.

Further, a portion that is surrounded by an alternate long and short dash line in FIG. 2A, which includes the position control system 29, the impedance calculating section 25, the desired trajectory generating section 23, and the first calculator 51, is a position control-based impedance control system (an impedance control section or an impedance controller) 49. The impedance control system 49 realizes the mechanical impedances of inertia $M_I$, damping $D_I$, and stiffness $K_I$. The robot arm control section 4 also functions as one example of a motion control section or a motion controller.

Figure 3:
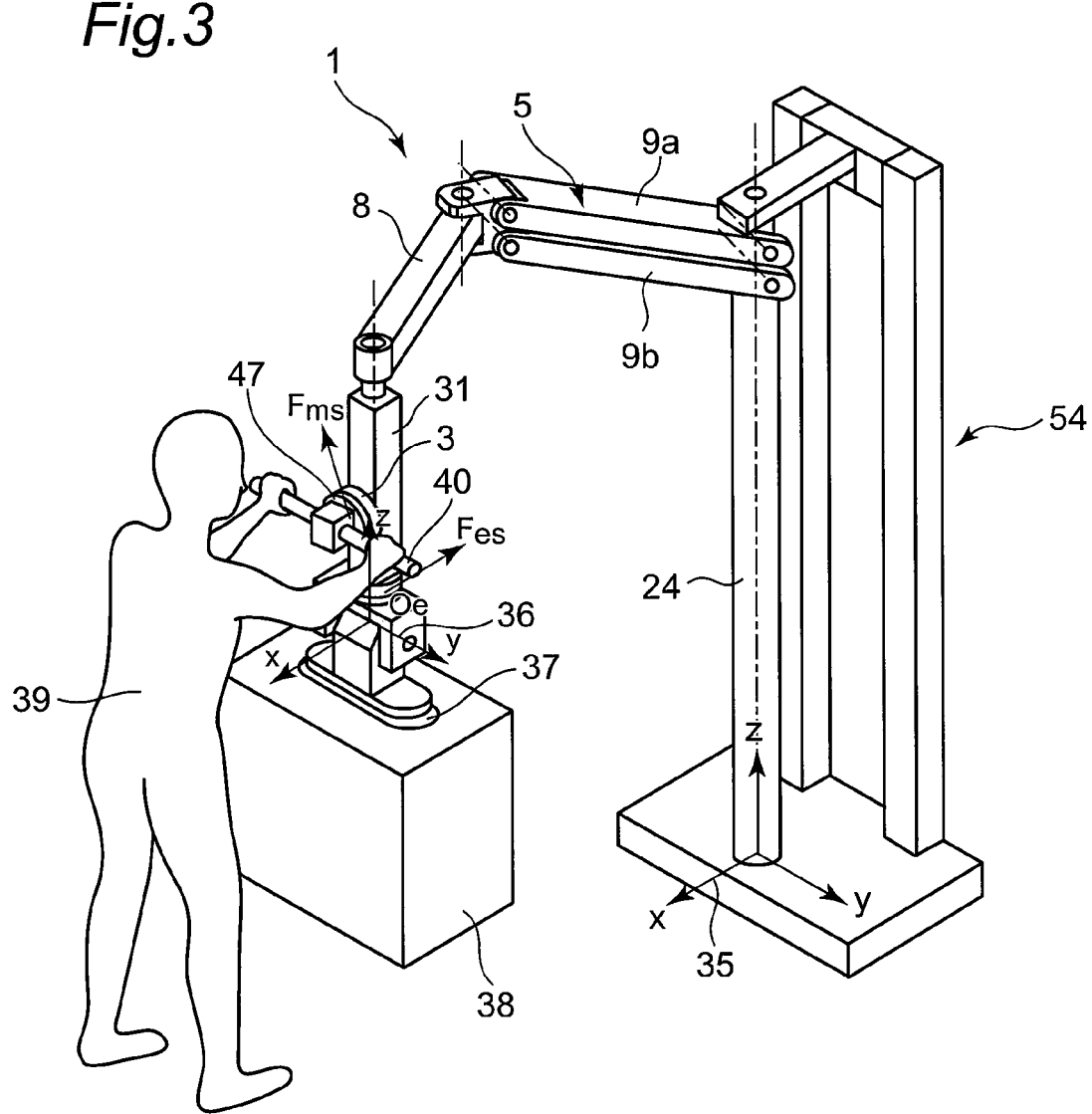
FIG. 3 is a view for describing a cooperative conveyance task with a person conducted by the robot according to the first embodiment.

The utilization of the above impedance control enables the cooperation task such as the cooperative conveyance of the object 38 between the person 39 and the robot arm 5 of the robot 1 as shown in FIG. 3. When the person 39 tries to move the object 38 and applies a force to a bar-shaped grip portion of the manipulation handle 40 with both hands, the force is transmitted to the robot arm 5 of the robot 1 via the manipulation handle 40. The force transmitted to the robot arm 5 is detected as a manipulation force $F_{ms}$ by the manipulation force sensor 3 of the robot arm 5. As to the manipulation force $F_{ms}$ to be an input from the manipulation force sensor 3 into the robot arm control section 4, the gravity of the manipulation handle is taken into consideration, and a difference between an origin $O_e$ of the arm tip coordinate system 36 and a position of a measurement surface 47 of the manipulation force sensor 3 is taken into consideration. For this reason, the force transformation section 30 makes a calculation based on the manipulation force $F_{ms}$ detected by the manipulation force sensor 3 using Equation (10), and a manipulation force $F_m$ calculated in this calculation is used.

$$F_m = \begin{pmatrix} {}^0R_e & 0_3 \\ 0_3^T & 1 \end{pmatrix} \begin{pmatrix} 1 & 0 & 0 & 0 \\ 0 & 1 & 0 & 0 \\ 0 & 0 & 1 & 0 \\ 0 & l_s & 0 & 1 \end{pmatrix} F_{ms} - \begin{pmatrix} 0 \\ 0 \\ mg \\ 0 \end{pmatrix} \quad (10)$$

Here, m is a mass of the manipulation handle 40, g is a gravity acceleration, ${}^0R_e$ is a rotation matrix for converting the orientation from the arm tip coordinate system 36 into the absolute coordinate system 35, and $l_s$ is a distance (perpendicular length) from the measurement surface 47 of the manipulation force sensor 3 to the joint shaft of the fourth joint 14. When the impedance control is performed employing the external force $F_m$ derived from Equation (10) as an input, the robot arm 5 moves along the direction of the force applied by the person 39. Accordingly, the cooperative conveyance is realized. Note that the mass m and the gravity acceleration g of the manipulation handle 40 are stored in the force transformation section 30 in advance.

Figure 4A:
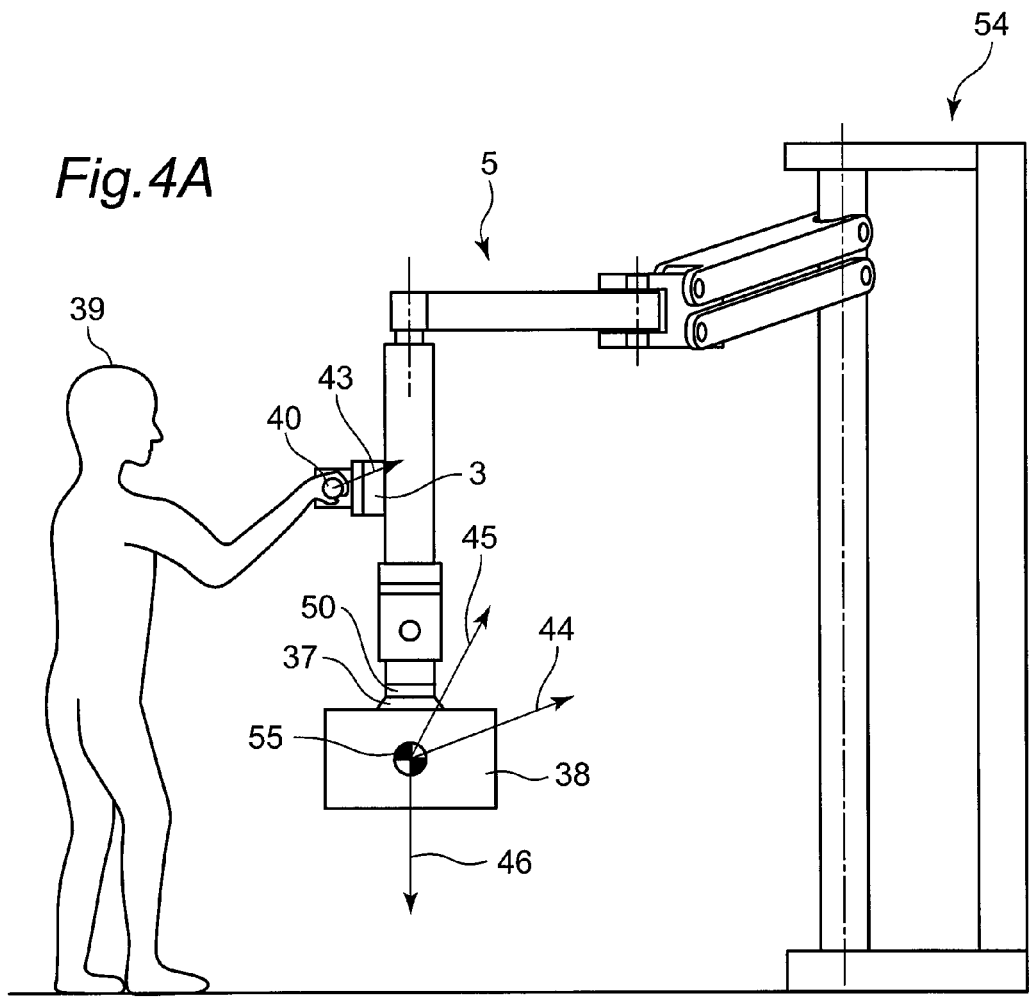
FIG. 4A is a view for describing a relationship between forces generated at the time of the conveyance task according to the first embodiment.
Figure 4B:
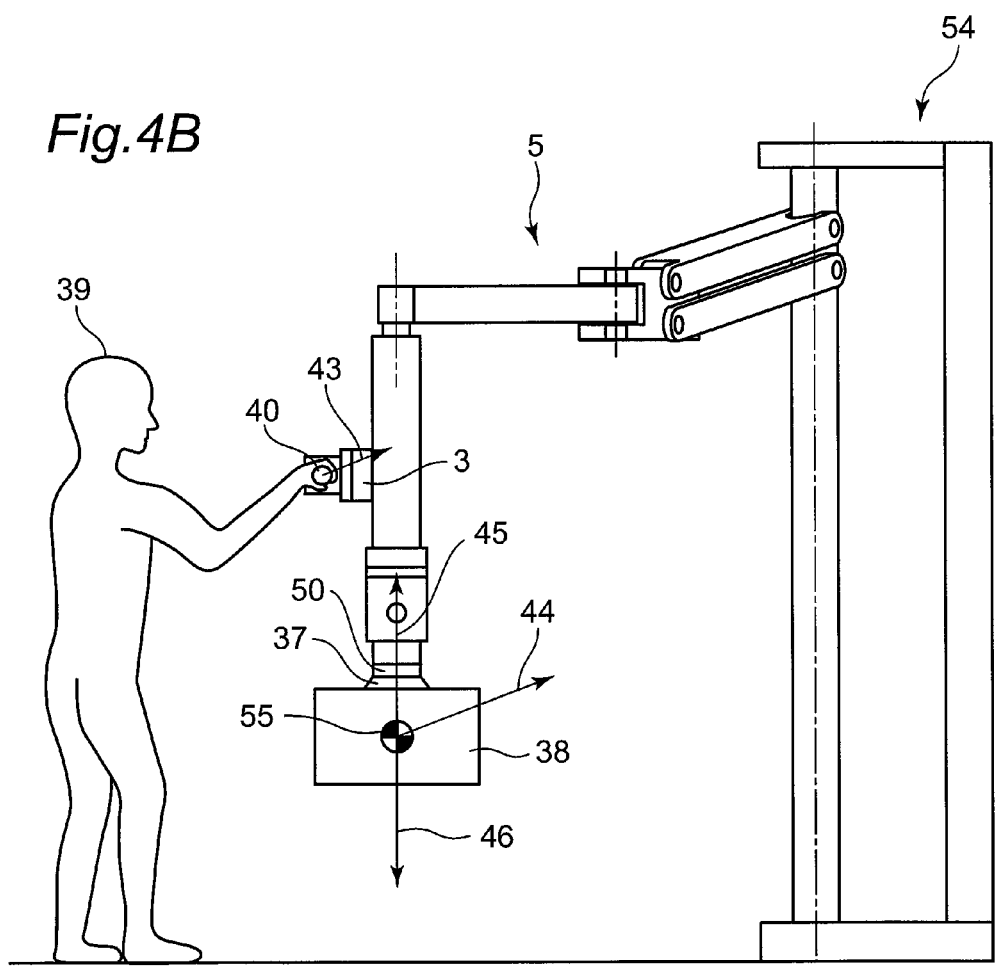
FIG. 4B is a view for describing a relationship between the forces generated at the time of the conveyance task according to the first embodiment.

FIGS. 4A and 4B are views each describing a relationship between the forces to be generated upon the conveyance task. FIG. 4A illustrates a case of a normal conveyance task. The normal conveyance task is a motion of only lifting and conveying an object, and does not indicate special motions such as a raising motion and a dragging motion.

In FIG. 4A, since an additional assist force is applied not to an upward direction in the vertical direction but to an obliquely upward direction, a horizontal component and a vertical component are generated. The generated horizontal component causes a shift of a rotation center of the gripped object 38 with respect to a floor surface 90, and thus a smooth rotating motion may be prevented.

On the other hand, FIG. 4B illustrates a case of gravity compensation employed in the first embodiment. The force that is applied to the manipulation handle 40 when the person 39 tries to move the object 38 is a manipulation force 43. The force that is applied to the object 38 from the robot arm 5 by the impedance control after the manipulation force 43 is applied to the manipulation handle 40 is an assist force 44. Vector directions of the manipulation force 43 and the assist force 44 are the same. Further, reference numeral 45 in the figure denotes an additional assist force, and is a force that is added to the assist force 44 based on the manipulation force 43. In the first embodiment, the gravity compensation is employed as the additional assist force. The additional assist force corresponds to a force that is generated by the gravity term $g_o(q)$ of the object 38 in the gravity term $g(q)$ of Equation (5). As shown in FIG. 4B, the additional assist force 45 is directed upward in the vertical direction. When the additional assist force 45 and a gravity 46 acting on the object 38 are balanced, the object 38 moves according to the assist force 44, and the person 39 can manipulate to move the object 38 as in a gravityless environment. The characteristic of the control apparatus 2 for the robot 1 according to the first embodiment of the present disclosure is that the assist force correcting section 34 is provided in addition to the basic configuration of the robot arm control section 4 described above. That is, as shown in FIG. 2B, the control apparatus 2 for the robot 1 includes a manipulation force acquiring unit 3, the resistance force acquiring unit 50, an impedance controller 49, and the assist force correcting section 34.

The manipulation force acquiring unit 3 is disposed on the multi-joint robot arm 5, and acquires the manipulation force $F_{ms}$ from the person 39. The below-described manipulation force sensor 3 functions as one example of the manipulation force acquiring unit 3.

The resistance force acquiring unit 50 is disposed on the multi-joint robot arm 5. The resistance force acquiring unit 50 acquires the resistance force 60 generated by friction caused by the contact between the gripped object 38 and the floor surface 90 when the motion of raising the gripped object 38 with respect to the floor surface 90 is conducted with one side of the gripped object 38 as a rotation center 33 while the contact between the object 38 gripped by the multi-joint robot arm 5 and the external environment (for example, floor surface) 90 is maintained. The below-described force sensor 50 functions as one example of the resistance force acquiring unit 50.

The impedance controller 49 performs impedance control of the multi-joint robot arm 5 based on the manipulation force $F_{ms}$ acquired by the manipulation force acquiring unit 3 and the set impedance parameters.

The assist force correcting section 34 corrects a force component (the additional assist force 45) vertical to the resistance force 60 of the assist force generated by the impedance controller 49 according to the resistance force 60 acquired by the resistance force acquiring unit 50, so that a desired resistance force $F_{Rgd}$ which is a desired value of the resistance force 60 becomes 0 when the motion of raising the gripped object 38 is conducted.

Figure 5A:
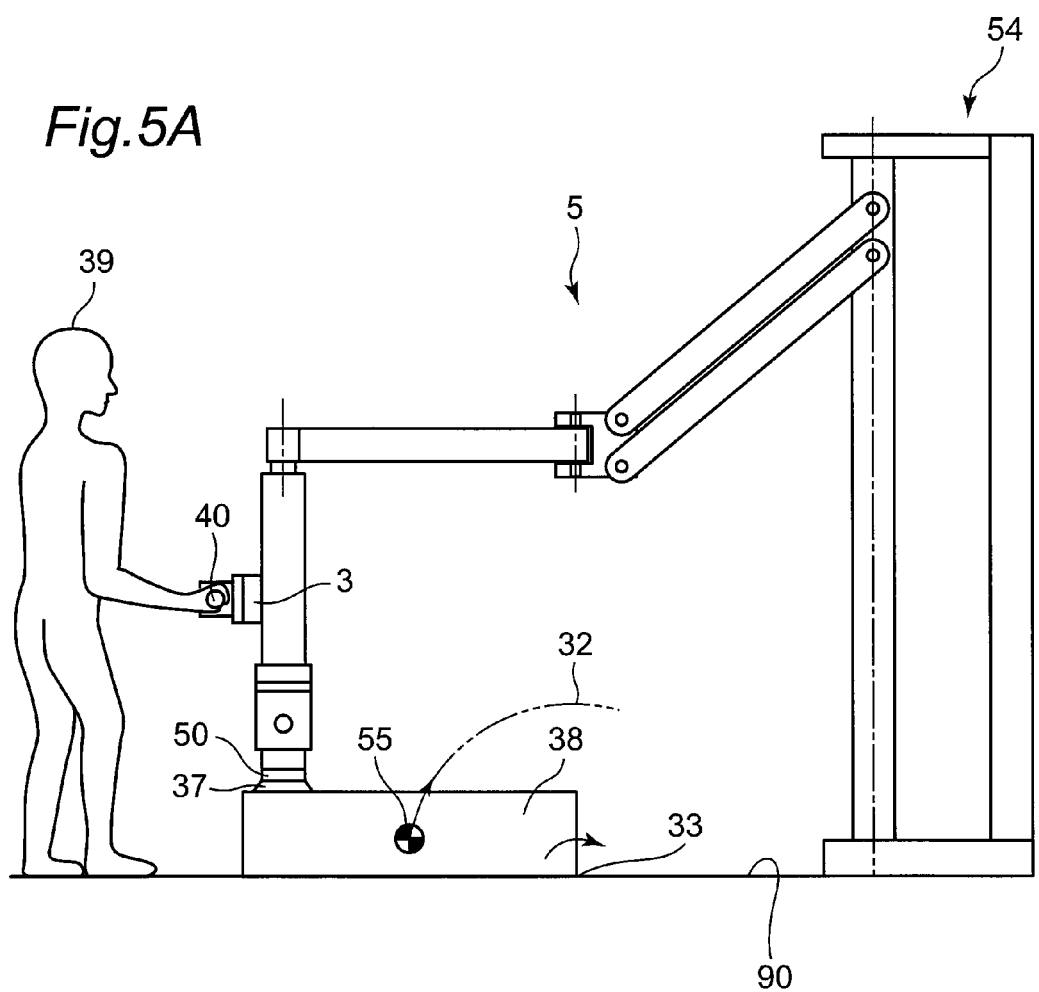
FIG. 5A is a view for describing a procedure of the conveyance task according to the first embodiment.
Figure 5B:
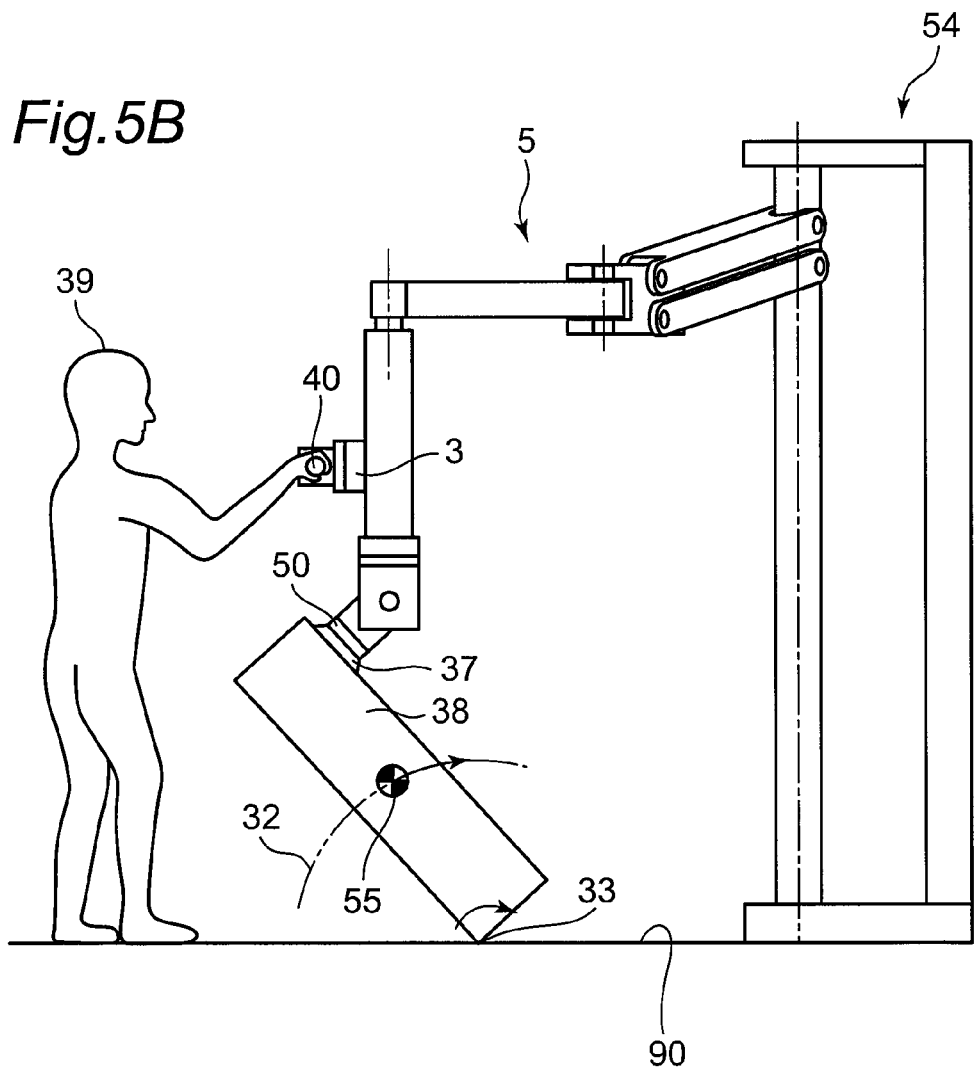
FIG. 5B is a view for describing a procedure of the conveyance task according to the first embodiment.
Figure 5C:
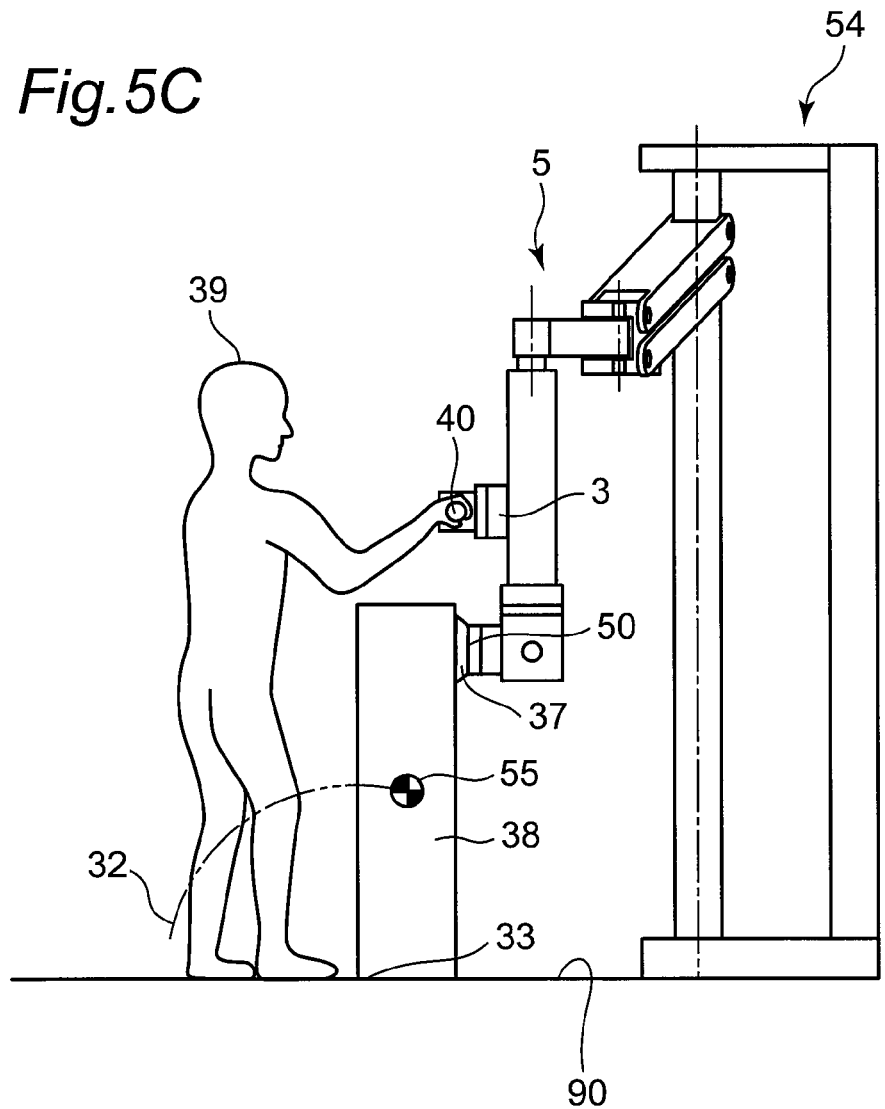
FIG. 5C is a view for describing a procedure of the conveyance task according to the first embodiment.

Details of the assist force correcting section 34 will be described below by exemplifying a case where the object conveyance task shown in FIGS. 5A to 5C is performed.

Contents of the object conveyance task shown in FIGS. 5A to 5C are as described below.

As shown in FIG. 5A, the object 38 on the floor surface 90 is sucked by the suction pad 37 so that the object 38 is gripped.

Thereafter, as shown in FIG. 5B, when the manipulation handle 40 is manipulated, the motion of raising the object 38 is conducted with one side of the object 38 in contact with the floor surface 90 as the rotation center 33, so that a centroid 55 of the object 38 is along an ideal trajectory 32 indicated by an alternate long and two short dashes line.

Then, as shown in FIG. 5C, the manipulation of the manipulation handle 40 brings the object 38 into the raised state.

The movement along the ideal trajectory 32 is the most efficient and smooth motion, but in the actual task, the motion completely along the ideal trajectory 32 is difficult, and thus the motion tends to be out of the ideal trajectory 32.

Figure 6A:
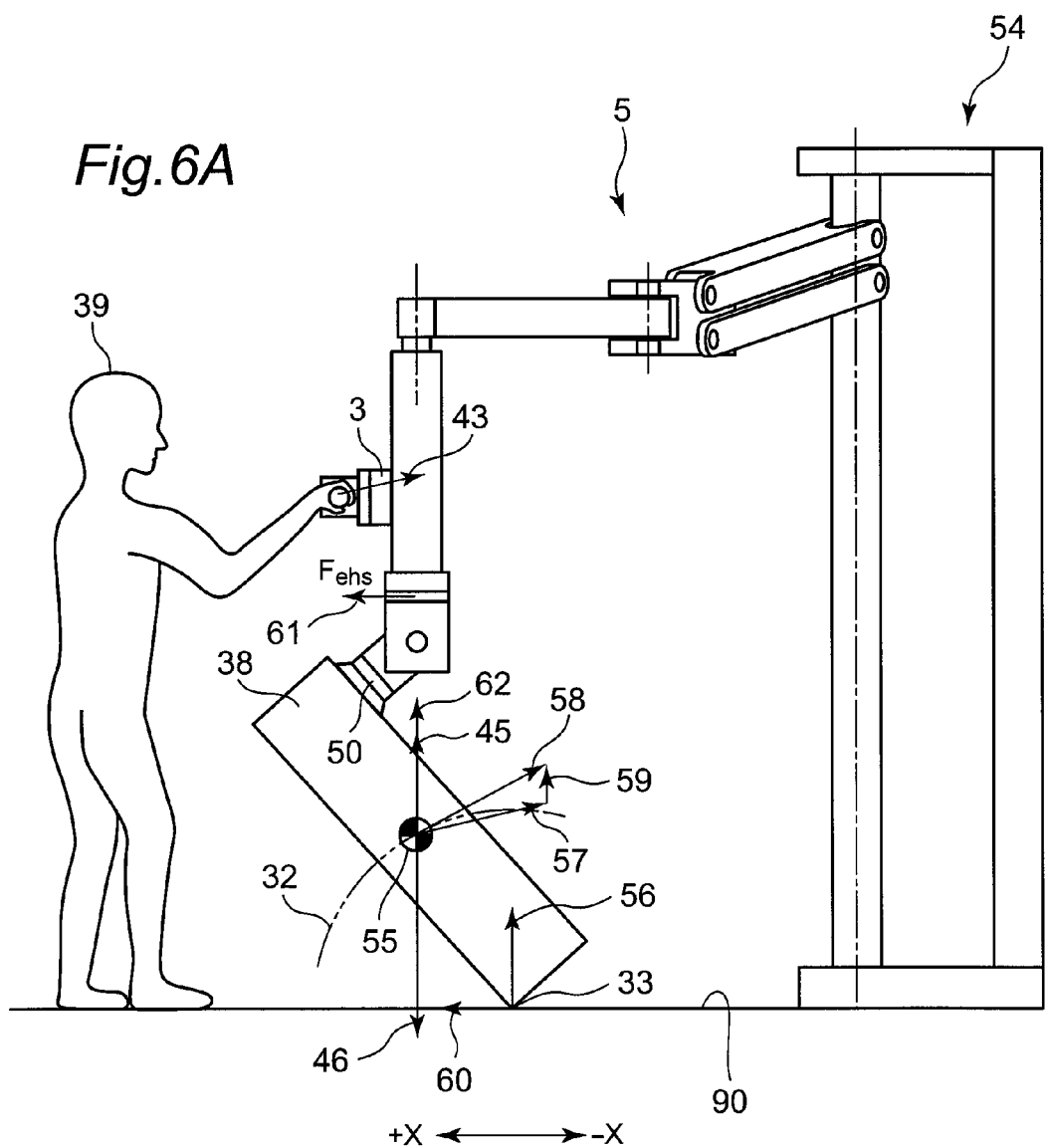
FIG. 6A is a view for describing a relationship between forces generated at the time of a raising task according to the first embodiment.

As to a force relationship, as shown in FIG. 6A, when the assist force is a force in a tangent direction of the ideal trajectory 32 like an ideal assist force 58, the gravity 46 directed downward along the vertical direction, the additional assist force 45 directed upward along the vertical direction, and a normal force 56 directed upward in a direction vertical to a plane of the external environment (for example, the floor surface) 90 (for example, a vertical direction) are balanced. Therefore, only a rotation moment is applied when viewed from the rotation center 33, and this is an ideal force relationship. However, as shown in FIG. 6A, when the direction is shifted as in the actual assist force 57, the resistance force 60 is generated by the friction between the object 38 and the floor surface 90 as one example of the external environment in the rotation center 33, and is detected as a horizontal component 61 of an external force by the external force sensor 50.

Figure 6B:
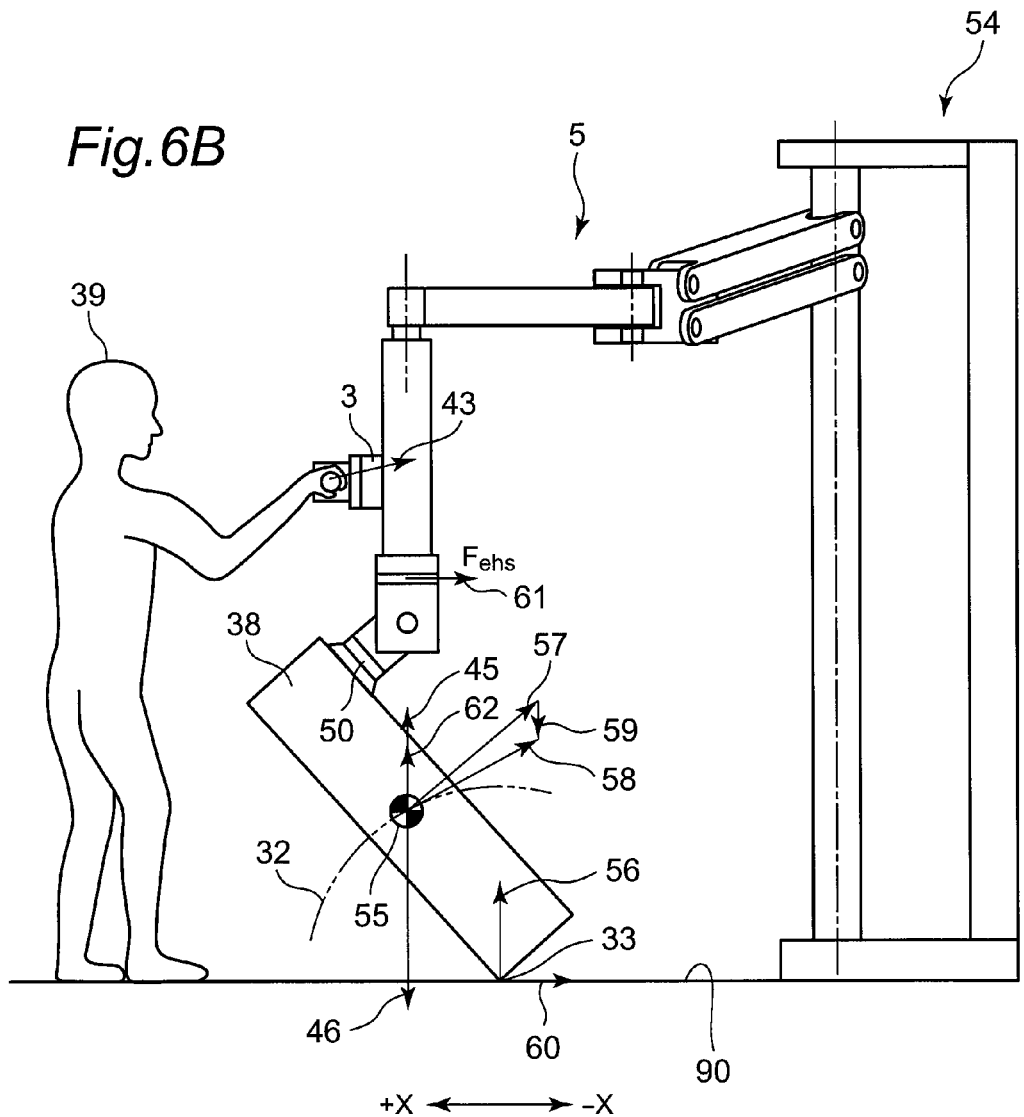
FIG. 6B is a view for describing a relationship between the forces generated at the time of the raising task according to the first embodiment.

As shown in FIG. 6B, when the direction of the actual assist force 57 greatly shifts, the resistance force 60 exceeds the friction, and thus the position of the rotation center 33 moves. As a result, the task becomes more difficult.

In order to cope with such a problem, the assist force correcting section 34 corrects the additional assist force 45 by a correction vector 59 of the assist force which is the vertical vector based on an external force 61 detected when the resistance force 60 is generated, thus performing the correction into a corrected additional assist force 62. By the correction in the assist force correcting section 34, the assist force is corrected from the actual assist force 57 into the ideal assist force 58. Such a correcting motion means that the assist force correcting section 34 corrects the assist force so that $F_{ehs}$ as the horizontal component of the resistance force 60 becomes 0.

In order to perform such a motion, the assist force correcting section 34 is configured by a direction controller 34a and a calculator 34b as shown in FIG. 2C.

The direction controller 34a determines whether the force component vertical to the resistance force 60 of the assist force is corrected to an increase direction or a decrease direction according to the direction of the resistance force 60 using the following Equation (11) or Equation (12).

The calculator 34b determines a correcting amount of the force component vertical to the resistance force 60 of the assist force in proportion to the magnitude of the resistance force 60 based on the direction determined by the direction controller 34a.

Specifically, the gravity compensation correction torque in Equation (8) is calculated by the assist force correcting section 34 using $$\Delta g(q, F_{ehs}) = \frac{K_1 |F_{ehs}|}{|g_o(q)|} g_o(q) \qquad (11)$$

(in a case where the horizontal component
$F_{ehs}$ of the external force is in a $+X$ direction)

$$\Delta g(q, F_{ehs}) = -\frac{K_1 |F_{ehs}|}{|g_o(q)|} g_o(q) \qquad (12)$$

(in a case where the horizontal component
$F_{ehs}$ of the external force is in a $-X$ direction)

Here, $K_1$ is a constant gain, and is an adjustment parameter acquired by an experiment.

According to Equations (11) and (12), as in the state of FIG. 6A, when the assist force 57 is directed downwards with respect to the ideal assist force 58 (corresponding to the case where the horizontal component $F_{ehs}$ of the external force is in the +X direction), the assist force correcting section 34 calculates the assist force based on Equation (11) so that the additional assist force increases. As a result, a force for lifting the object 38 of the robot arm 5 increases, so that the correction is made into the motion along the ideal trajectory 32.

On the other hand, when the assist force 57 is directed upward with respect to the ideal assist force 58 as in the state of FIG. 6B (corresponding to the case where the horizontal component $F_{ehs}$ of the external force is in the −X direction), the assist force correcting section 34 makes a calculation based on Equation (12), so that the additional assist force decreases. As a result, a force of the robot arm 5 to lift the object 38 decreases, so that the correction is made into the motion along the ideal trajectory 32.

Figure 7:
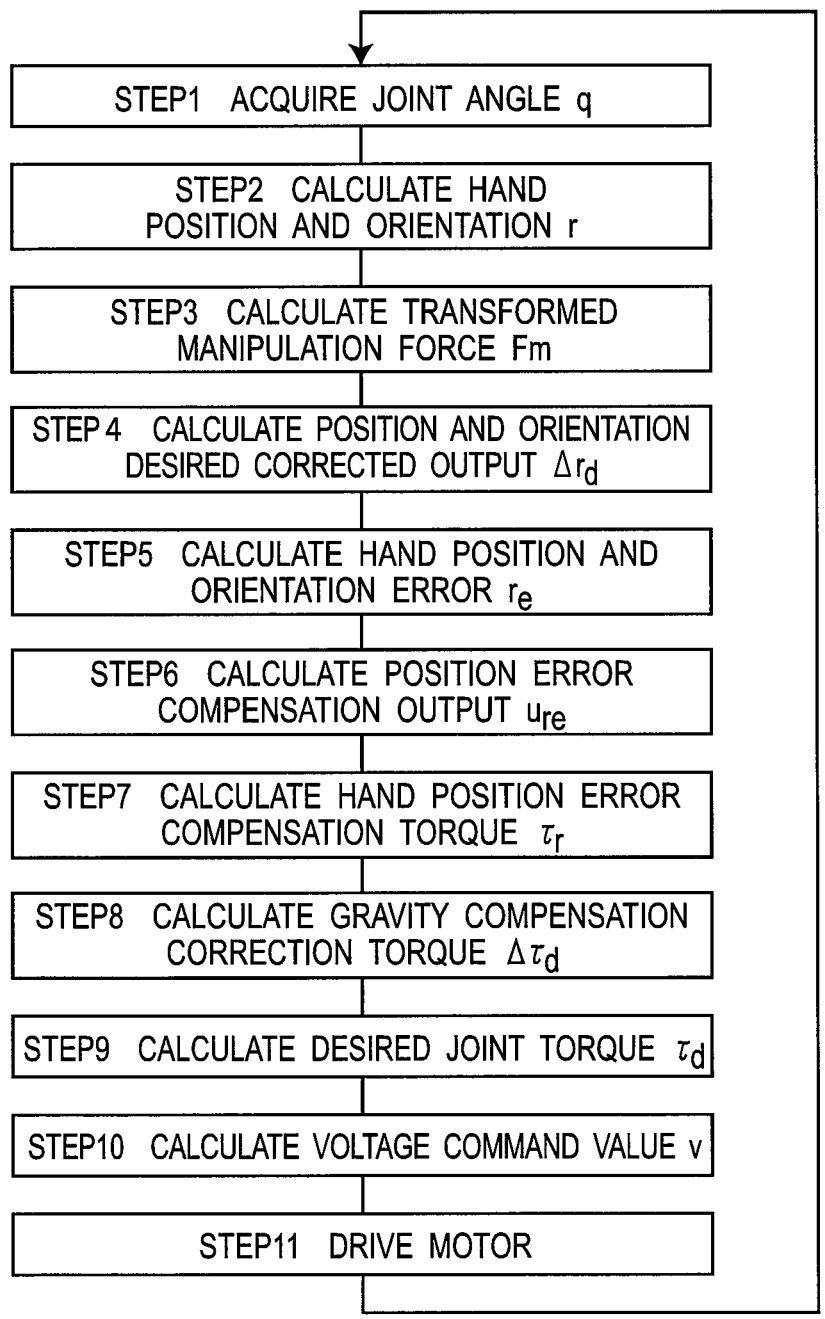
FIG. 7 is a flowchart showing the entire motion step of the robot arm control section for the robot according to the first embodiment.

FIG. 7 is a flowchart for describing motion steps at the time of robot arm control performed by the control program based on the principle described above.

In step S1, when the motion of the robot arm 5 is controlled, joint angle data (the joint angle vector q) measured by the encoders 42 at the joint shafts of the joints of the robot arm 5 are taken into the robot arm control section 4 of the control apparatus 2.

Next, in step S2, the forward kinematics calculating section 26 calculates the hand position and orientation vector r of the robot arm 5 at current time (when the motion of the robot arm 5 is controlled) based on the joint angle data (the joint angle vector q) from the robot arm 5 (the process in the forward kinematics calculating section 26). The hand position and orientation vector r is input from the forward kinematics calculating section 26 into the desired trajectory generating section 23 and the position error calculating unit 52.

Next, in step S3, the manipulation force $F_{ms}$ as the measured value of the manipulation force sensor 3 is taken into the force transformation section 30, and the force transformation section 30 calculates a transformed manipulation force $F_m$ based on the manipulation force $F_{ms}$ and Equation (8). As a result, the manipulation force $F_{ms}$ as the measured value of the manipulation force sensor 3 is transformed into the transformed manipulation force $F_m$ by the force transformation section 30. The transformed manipulation force $F_m$ is output from the force transformation section 30 to the impedance calculating section 25.

Next, in step S4, the impedance calculating section 25 calculates the hand position and orientation desired corrected output $\Delta r_d$ based on impedance parameters $M_I$, $D_I$, and $K_I$ and the transformed manipulation force $F_m$ transformed by the force transformation section 30 (the process in the impedance calculating section 25). The calculated hand position and orientation desired corrected output $\Delta r_d$ is output from the impedance calculating section 25 to the first calculator 51.

Next, in step S5, the first calculator 51 calculates a sum of the hand position and orientation desired vector $r_d$ from the desired trajectory generating section 23 and the hand position and orientation desired corrected output $\Delta r_d$ from the impedance calculating section 25. The hand position and orientation corrected desired vector $r_d$, obtained by calculation in the first calculator 51 is output to the position error calculating unit 52. The position error calculating unit 52 calculates a hand position and orientation error $r_e$ that is a difference between the hand position and orientation corrected desired vector $r_{dm}$ obtained by the calculation in the first calculator 51 and the present hand position and orientation vector r from the forward kinematics calculating section 26.

Next, in step S6, the hand position and orientation error $r_e$ obtained by calculation in the position error calculating unit 52 is input into the position error compensating section 27, and the position error compensating section 27 obtains the position error compensation output $u_{re}$ based on the error $r_e$ (the process in the position error compensating section 27). The PID compensator is considered as a specific example of the position error compensating section 27. In the position error compensating section 27, appropriate adjustment of the three gains of proportional, differential, and integral structuring the diagonal matrix of constants allows the control to be performed so that the position error converges to 0.

Next, in step S7, the dynamics control section 28 receives the position error compensation output $u_{re}$ from the position error compensating section 27, and calculates the hand position error compensation torque $\tau_r$ based on the joint angle vector q and the dynamics parameters (inertia matrix (inertia force term), the centrifugal force and Coriolis force term, and the gravity term) using Equation (5) (the process in the dynamics control section 28). The hand position error compensation torque $\tau_r$ is input from the dynamics control section 28 into the desired torque calculating unit 53.

Next, in step S8, the assist force correcting section 34 takes in the external force $F_{es}$ as the measured value of the external force sensor 50 and the joint angle data from the respective encoders 42 (the joint angle vectors q), and calculates the gravity compensation correction torque $\Delta\tau_g$ based on Equation (8), Equation (11), or Equation (12) (the process in the assist force correcting section 34). The gravity compensation correction torque $\Delta\tau_g$ is input from the assist force correcting section 34 into the desired torque calculating unit 53.

Next, in step S9, the desired torque calculating unit 53 calculates the sum of the hand position error compensation torque $\tau_r$ calculated by the dynamics control section 28 and the gravity compensation correction torque $\Delta\tau_g$ calculated by the assist force correcting section 34.

Next, in step S10, the desired torque $\tau_d$ calculated by the desired torque calculating unit 53 and a current i flowing in the motor 41 are input into the torque control section 48, and the voltage command value v is calculated by using Equation (9) (the process in the torque control section 48).

Next, in step S11, the voltage command value v is provided from the torque control section 48 to the motor driver 18 via the D/A board 20. When the motor driver 18 changes a current amount in each of the motors 41, the rotary motion of each joint shafts of each joint of the robot arm 5 is generated.

Repetitive execution of steps S1 to S11 as the control calculation loop realizes control made over the motion of the robot arm 5.

As described above, in the first embodiment, the provision of the assist force correcting section 34 enables the assist force correcting section 34 to correct the additional assist force 45 into the corrected additional assist force 62 by the correction vector 59 of the assist force as the vertical vector based on an external force 61 detected when the resistance force 60 is generated. For this reason, in a power assist robot using the impedance control, the assist force is corrected from the actual assist force 57 into the accurate, in other words, ideal assist force 58 so that the resistance force 60 becomes 0. Therefore, since the trajectory of the object 38 is along the ideal trajectory 32, the position of the rotation center 33 does not change, and the raising task of the object 38 as one example of the task involving the contact is easily enabled.

Further, in the first embodiment, when the assist force is controlled so that the horizontal component of the resistance force becomes 0, the motion along the ideal trajectory 32 is enabled without geometric information about the ideal trajectory 32, namely, the geometric information such as a dimension of the object 38 to be raised. Thus, an efficient task is enabled even if objects of various dimensions are handled. That is, the additional assist force is corrected into the corrected additional assist force by the correction vector of the assist force as the vertical vector based on the external force detected when the resistance force is generated. For this reason, in the power assist robot using the impedance control, the assist force is corrected from the actual assist force into an accurate assist force suitable for the task involving the contact so that the horizontal component of the resistance force becomes 0. Therefore, without lifting and floating the gripped object 38 from the floor surface 90, the task involving the contact in which the gripped object 38 maintains the contact with the floor surface 90 can be easily realized. As a result, a load on the gripped object 38 is reduced, and task efficiency can be improved. Particularly, when an accurate task is conducted, since the assist force necessary in the control apparatus is corrected, a person can easily perform the task without particularly caring about the ideal trajectory 32. For this reason, a predetermined accurate task can be easily conducted even on the gripped object 38, which may be out of shape when the resistance force is too strong, without damaging the gripped object 38.

Figure 8:
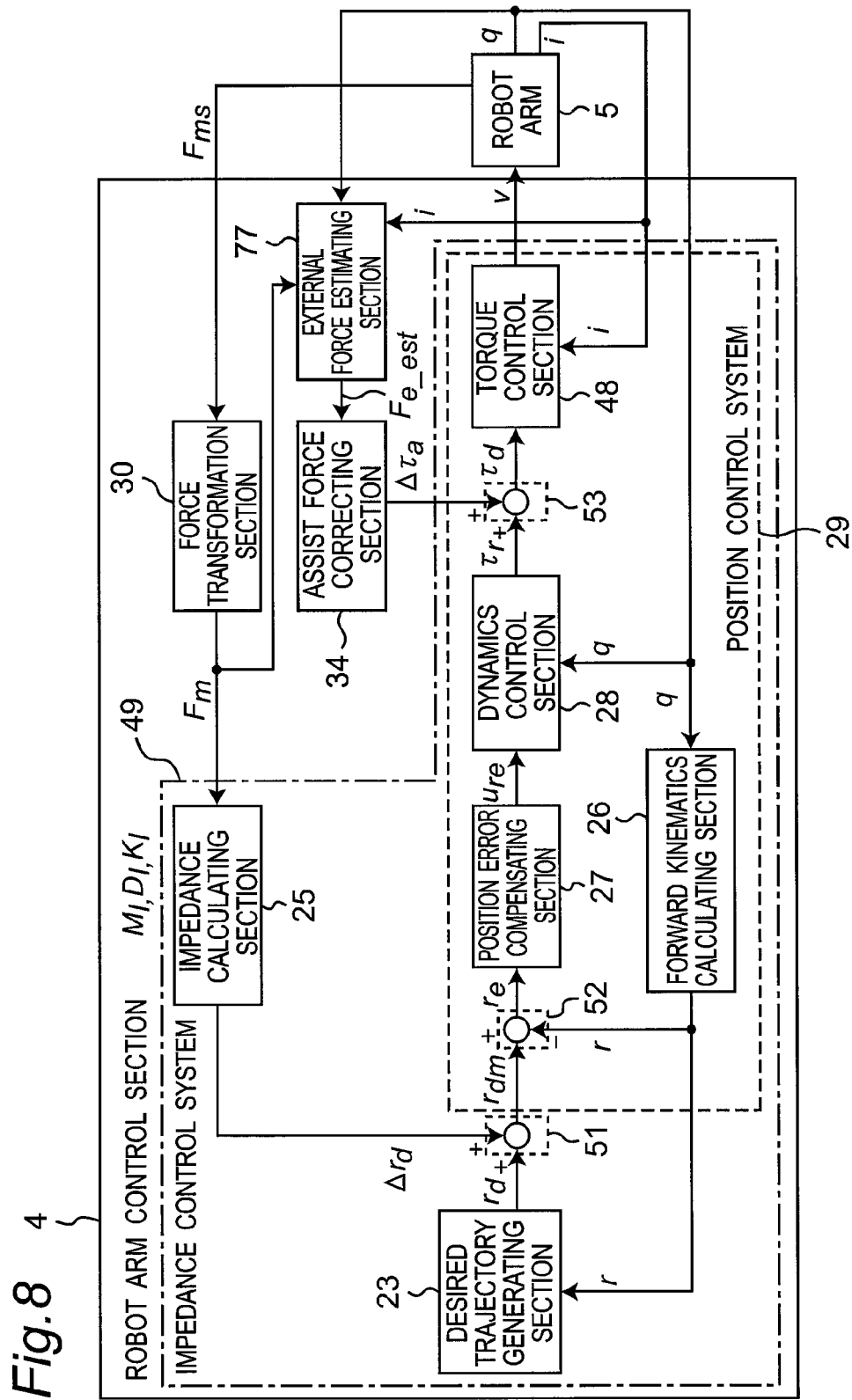
FIG. 8 is a block diagram illustrating a configuration of the robot arm control section for the robot according to a modified example of the first embodiment.

In the first embodiment, the external force sensor 50 is used as the external force acquiring unit, but the present disclosure is not limited thereto, and external force estimation can be also used. A configuration in this case is shown in FIG. 8. That is, an external force estimating section (an external force estimating unit or a resistance force estimating unit) 77 estimates a torque generated on each joint of the multi-joint robot arm as a torque estimation value, and receives the estimated torque estimation value, the joint angle vector q that is the present value q of each joint angle output from the encoder 42, a motor driving current value i from the motor driver 18, and the transformed manipulation force $F_m$ from the force transformation section 30. The external force estimating section 77 calculates an estimation value $F_{e\_est}$ of the external force (resistance force) and outputs the calculated estimation value $F_{e\_est}$ to the assist force correcting section 34. Here, the external force estimating section 77 functions as one example of the resistance force acquiring unit 50.

The external force estimating section 77 acquires the motor driving current value i from the motor driver 18, and obtains an estimation value $\tau_{Mest}=K_M/i$ of the joint torque generated by the motor 41. Further, the external force estimating section 77 uses the equation of motion of the robot arm 5, and obtains the estimation value $\tau_{est}$ of the torque necessary for the motion of the robot arm 5 using the following Equation (13) based on the estimation value $\tau_{Mest}$ of the joint torque, the joint angle vector q that is the present value q of each joint angle output from the encoder 42, and the transformed manipulation force $F_m$ acquired from the force transformation section 30.

$$\tau_{est}=M(q)\ddot{q}+h(q,\dot{q})+g(q) \qquad (13)$$

Therefore, when addition of the transformed manipulation force $F_m$ from the person is taken into consideration, the estimation value $F_{e\_est}$ of the external force is provided by $$F_{e\_est}=J^T(q)(\tau_{Mest}-\tau_{est})-F_m \qquad (14)$$

The use of Equation (14) enables the external force estimating section 77 to estimate the external force and enables the task motion according to the resistance force without providing the external force sensor 50.

Second Embodiment

Since the basic configuration of the robot 1 according to a second embodiment of the present disclosure is similar to that in the first embodiment shown in FIGS. 1 and 2A, the common portions are denoted by the same reference numerals as those in the first embodiment, and descriptions thereof are omitted. Only different portions are described in detail below.

The conveyance task according to the second embodiment will be described with reference to FIG. 9. In the second embodiment, an object 38 is not lifted by a robot arm 5 into a state of being separated from a floor surface 90, but an additional assist force 45 is applied from the robot arm 5 in a direction of lifting the object 38 with the object 38 touching the floor surface 90. As a result, a normal force 56 is reduced. In this manner, a motion of conveying the object 38 by the robot arm 5 can be conducted so as to drag the object 38 along the floor surface 90 with the object 38 in contact with the floor surface 90 (namely, the normal force 56≥0).

In the second embodiment, an assist force correcting section 34 calculates a gravity compensation correction torque using the following Equation (15).

$$\Delta g(q, F_{ehs}) = \frac{K_2(F_{Rgd}-|F_{ehs}|)}{|g_o(q)|}g_o(q) - \frac{1}{\mu}J^{-T}(q)\begin{bmatrix}0\\0\\F_{Rgd}\\0\end{bmatrix} \qquad (15)$$

Here, $F_{Rgd}$ is a desired resistance force, and μ is a coefficient of kinetic friction. $K_2$ is a constant gain, and is an adjustment parameter obtained by an experiment.

According to Equation (15), in a case where a representative coefficient of kinetic friction between the object 38 and the floor surface 90 is set as the setting coefficient of kinetic friction μ, a resistance force 60 is increased when the coefficient of kinetic friction during the conveyance motion is larger than the setting coefficient of kinetic friction p. For this reason, the additional assist force 45 which is a force for lifting the object 38 using the robot arm 5 is increased by the assist force correcting section 34. In this manner, the motion can be made so that the normal force 56 is decreased and the resistance force 60 is not increased. On the contrary, when the coefficient of kinetic friction during the conveyance motion is smaller than the setting coefficient of kinetic friction μ, the resistance force 60 is decreased. For this reason, the additional assist force 45 is decreased by the assist force correcting section 34. In this manner, the motion can be conducted so that the normal force 56 is increased and the resistance force 60 is not decreased. That is, the assist force correcting section 34 corrects a force component (the normal force 56) vertical to the resistance force 60 of the assist force generated by the impedance controller 49 according to the resistance force 60 acquired by a manipulation force sensor 3 so that a desired resistance force $F_{Rgd}$ that is the desired value of the resistance force 60 has a constant value when the motion of dragging the gripped object 38 along the floor surface 90 is conducted. With the above motion, even when the coefficient of kinetic friction during the conveyance motion fluctuates according to the position of the floor surface 90, control for making the resistance force 60 that acts between the object 38 and the floor surface 90 close to the set desired resistance force $F_{Rgd}$ can be made by the assist force correcting section 34 and an impedance control system 49.

As described above, according to the second embodiment, the assist force correcting section 34 is provided. As a result, when the resistance force 60 deviates from the desired resistance force $F_{Rgd}$, the assist force correcting section 34 increases or decreases the normal force 56, and the assist force correcting section 34 is controlled so that the resistance force 60 that acts between the object 38 and the floor surface 90 is constant. For this reason, the fluctuation in the resistance force 60 is decreased, and the motion of conveying the object 38 so as to be dragged along the floor surface 90 can be conducted stably and easily. Therefore, even when a conveyable weight of the robot arm 5 is not enough to completely lift the object 38, or the strength of the object 38 is too weak to completely lift the object 38, the motion of dragging the object 38 on the floor surface 90 is conducted so as to enable stable conveyance.

The desired resistance force $F_{Rgd}$ may be determined by an experiment considering the maneuverability at the time of manipulating the robot arm 5. However, $\mu_{max}(mg-F_{Amax}) < F_{Rgd} < \mu_{min}mg$ may be considered as the setting range. In the case where $mg < F_{Amax}$, (when transportability sufficient for lifting the object 38 is provided to the robot arm 5), the lower limit value $\mu_{max}(mg-F_{Amax})$ is 0. Here, m is the mass of the object 38, g is a gravity acceleration thereof, $\mu_{max}$ is a maximum coefficient of kinetic friction that can be generated, $\mu_{min}$ is a minimum coefficient of kinetic friction that can be generated, and $F_{Amax}$ is a maximum force that can be generated as the lifting force by the robot arm 5. The necessary environment information such as the maximum coefficient of kinetic friction $\mu_{max}$, the minimum coefficient of kinetic friction $\mu_{min}$, the mass m of the object 38, and the gravity acceleration g is stored in a database of the assist force correcting section 34 in advance.

When the desired resistance force $F_{Rgd}$ that is smaller than the lower limit value $\mu_{max}(mg-F_{Amax})$ is set in the assist force correcting section 34, the force for lifting the robot arm 5 is not sufficient, and the desired resistance force $F_{Rgd}$ cannot be achieved in some cases. Further, in the assist force correcting section 34, when the desired resistance force $F_{Rgd}$ larger than the upper limit $\mu_{min}mg$ is set, the robot arm 5 may need to exert, not the force for lifting the object 38, but on the contrary, a force for pushing the object 38 against the floor surface 90. Such a motion is unsuitable as the power assist device for conveying a heavy load. Therefore, as one example, the setting range of the desired resistance force $F_{Rgd}$ may be set to $\mu_{max}(mg-F_{Amax}) < F_{Rgd} < \mu_{min} mg$.

Third Embodiment

Since the basic configuration of the robot 1 according to a third embodiment of the present disclosure is similar to that in the first embodiment shown in FIGS. 1 and 2A, the common portions are denoted by the same reference numerals as those in the first embodiment, and description thereof are omitted. Only different portions are described in detail below.

Figure 10A:
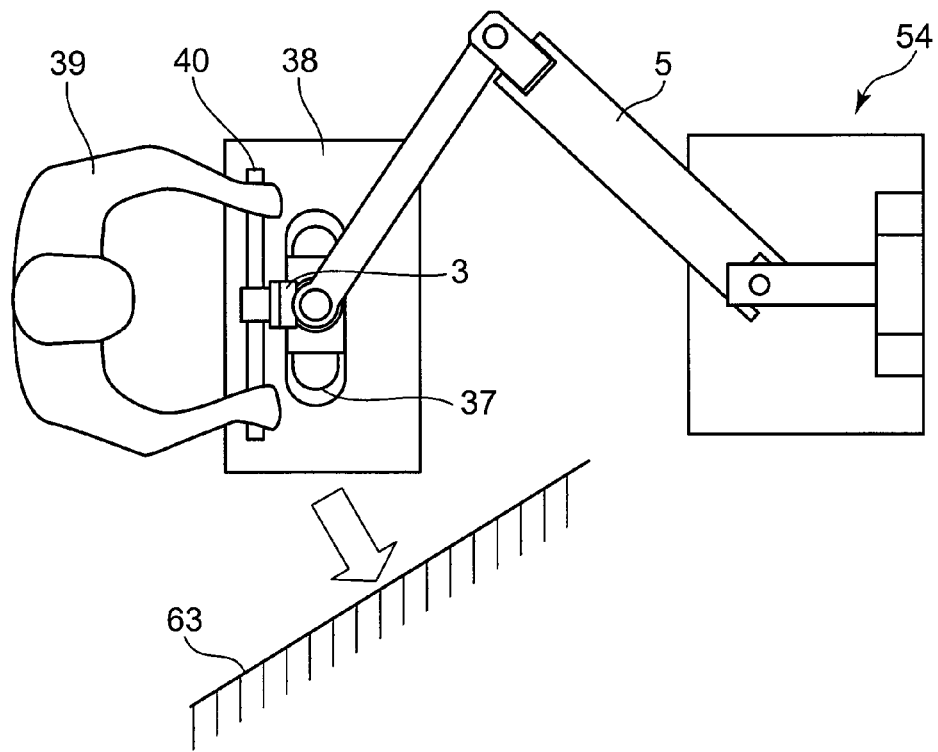
FIG. 10A is a view for describing a conveyance task according to a third embodiment.
Figure 10B:
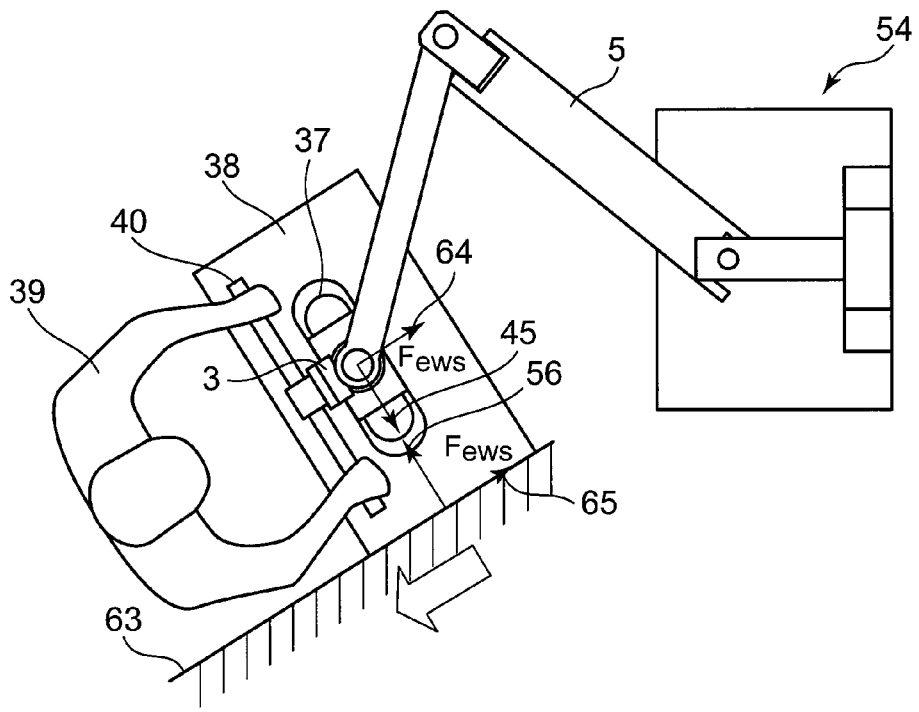
FIG. 10B is a view for describing the conveyance task according to the third embodiment.
Figure 10C:
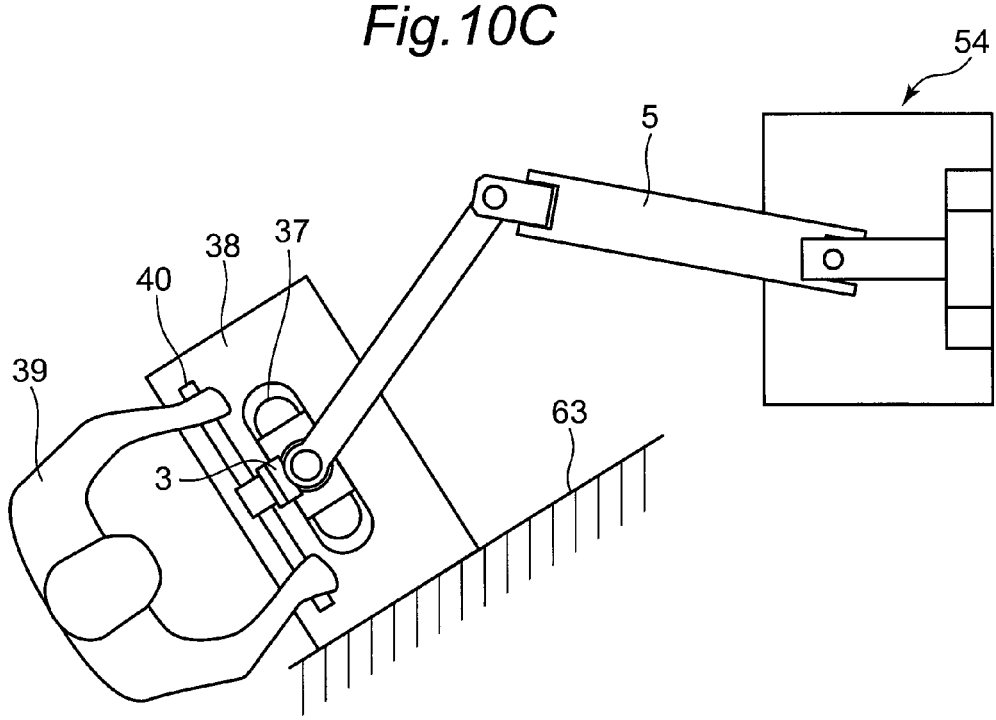
FIG. 10C is a view for describing the conveyance task according to the third embodiment.

A conveyance task of an object 38 according to the third embodiment will be described with reference to FIG. 10A to FIG. 10C. In the third embodiment, in order to position the object 38, while the object 38 is pressed against a surface of a wall surface 63 as one example of the external environment, the conveyance task to set the object 38 at a predetermined position is conducted. FIG. 10A illustrates a motion of bringing the object 38 in contact with the wall surface 63. FIG. 10B illustrates a motion of moving (dragging) the object 38 to a desired position along the wall surface 63 with the object 38 in contact with the wall surface 63. FIG. 10C illustrates a state in which the object 38 is moved to the desired position along the wall surface 63 with the object 38 in contact with the wall surface 63.

In the third embodiment, the force control is applied to an assist force correcting section 34, and the assist correction torque is calculated by using the following Equation (16).

$$\tau_a = -J^T(q)K_3 \int_0^t (F_{Rfd} - F_{ews}) dt' - J^T(q) \frac{F_{Rfd}}{\mu} \quad (16)$$

Here, $F_{Rfd}$ is a desired resistance force vector, $F_{ews}$ is a component 64 parallel to the wall surface 63 of the external force, and has the same magnitude and direction as those of a resistance force 65. $K_3$ is a constant gain matrix, and is an adjustment parameter acquired by an experiment. In the assist force correcting section 34, a force for pressing the object 38 against the wall surface is generated as an additional assist force 45 by the control based on Equation (16), and the additional assist force 45 is increased or decreased according to magnitude of a component $F_{ews}$ parallel to the wall surface 63 of the external force.

According to Equation (16), after the representative coefficient of kinetic friction between the object 38 and the wall surface 63 is set as the set coefficient of kinetic friction μ, even if the coefficient of kinetic friction fluctuates according to the position of the wall surface 63 during the conveyance motion, the additional assist force 45 for the robot arm 5 to press the object 38 against the wall surface 63 is decreased by the assist force correcting section 34 when the coefficient of kinetic friction is larger than the setting coefficient of kinetic friction μ. On the contrary, when the coefficient of kinetic friction is smaller than the setting coefficient of kinetic friction μ, the additional assist force 45 is increased by the assist force correcting section 34. In this manner, a normal force 56 is increased or reduced, and control for making a resistance force 60 that acts between the object 38 and the wall surface 63 close to a set desired resistance force vector $F_{Rfd}$ can be made by the assist force correcting section 34 and the impedance control system 49. That is, the assist force correcting section 34 corrects a force component (the additional assist force 45) vertical to the resistance force 60 of the assist force generated by an impedance controller 49 according to the resistance force 60 acquired by a manipulation force sensor 3 so that a component $F_{ews}$ of the resistance force 60 parallel to the wall surface at the time of the motion of dragging the gripped object 38 on the wall surface 63 becomes the desired resistance force vector $F_{Rfd}$.

As described above, according to the third embodiment, the assist force correcting section 34 is provided. As a result, the assist force correcting section 34 makes control so that the resistance force 60 that acts between the object 38 and the wall surface 63 is constant, and fluctuation decreases. For this reason, the motion of conveying the object 38 to be slid (dragged) on the wall surface 63 can be conducted stably and easily.

Fourth Embodiment

Since the basic configuration of the robot 1 according to a fourth embodiment of the present disclosure is similar to that in the first embodiment shown in FIG. 1, the common portions are denoted by the same reference numerals as those in the first embodiment, and descriptions thereof are omitted. Only different portions are described in detail below.

Figure 11:
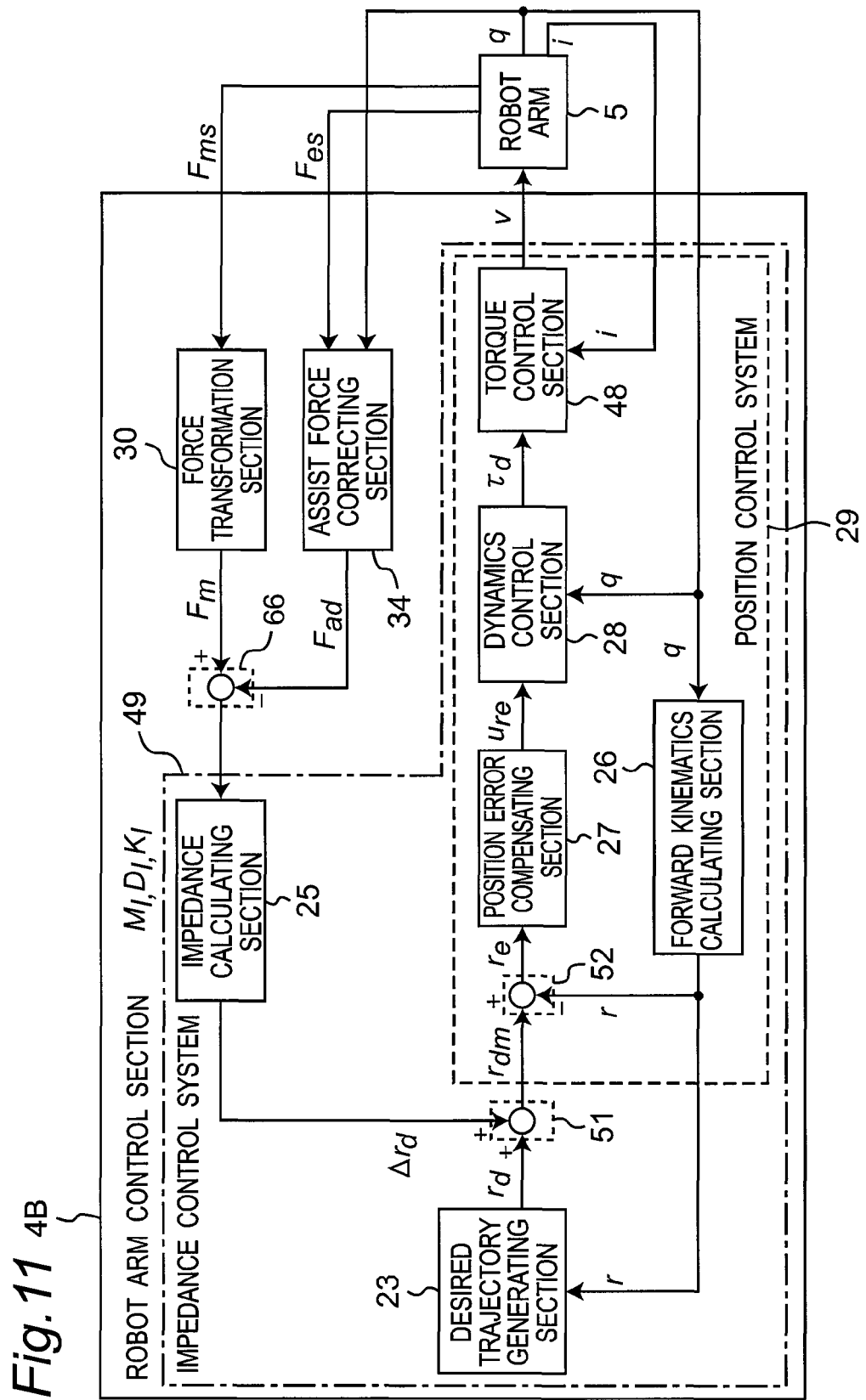
FIG. 11 is a block diagram illustrating a configuration of a robot arm control section for the robot according to a fourth embodiment.

FIG. 11 is a block diagram illustrating a configuration of a robot arm control section 4B of a robot according to the fourth embodiment.

In the fourth embodiment, the conveyance task similar to that in the third embodiment shown in FIGS. 10A to 10C is conducted.

In the fourth embodiment, force control through impedance control is applied to an assist force correcting section 34, and a desired additional assist force $F_{ad}$ is calculated by the following Equation (17).

$$F_{ad} = -K_4 \int_0^t (F_{Rfd} - F_{ews}) dt' \quad (17)$$

Here, $F_{Rfd}$ is a desired resistance force vector, $F_{ews}$ is a component 64 parallel to the wall surface 63 of the external force, and has the same magnitude and direction as those of a resistance force 65. $K_4$ is a constant gain matrix, and is an adjustment parameter obtained by an experiment.

The desired additional assist force $F_{ad}$ calculated by the assist force correcting section 34 using Equation (17) is subtracted from a transformed manipulation force $F_m$ which has been transformed in a force transformation section 30 by a force input calculating unit 66, and the calculated value is input from the force input calculating unit 66 into an impedance calculating section 25.

A force for pressing an object 38 against the wall surface 63 is generated as the additional assist force 45 by the control based on Equation (17), and the assist force correcting section 34 increases and decreases the additional assist force 45 according to magnitude of the component $F_{ews}$ parallel to the wall surface 63 of an external force.

According to Equation (17), after a representative coefficient of kinetic friction between the object 38 and the wall surface 63 is set as a coefficient of kinetic friction μ, even if the coefficient of kinetic friction fluctuates according to the position of the wall surface 63, the additional assist force 45 which is a force of a robot arm 5 for pressing the object 38 against the wall surface 63 is decreased by the assist force correcting section 34 when the coefficient of kinetic friction is larger than the setting coefficient of kinetic friction μ. On the contrary, when the coefficient of kinetic friction is smaller than the set setting coefficient of kinetic friction μ, the additional assist force 45 is increased by the assist force correcting section 34 so that a normal force 56 is increased or decreased. As a result, control for making a resistance force that acts between the object 38 and the wall surface 63 close to the set desired resistance force vector $F_{Rfd}$ can be made by the assist force correcting section 34 and an impedance control system 49.

As described above, according to the fourth embodiment, the assist force correcting section 34 is provided. As a result, the assist force correcting section 34 makes control so that a resistance force 60 that acts between the object 38 and the wall surface 63 is constant, and thus fluctuation is decreased. For this reason, a motion of conveying the object 38 so as to be slid on the wall surface 63 can be conducted stably and easily.

In the fourth embodiment, the task of pressing the object 38 against the wall surface 63 illustrated in FIGS. 10A to 10C has been described as an example, but the present disclosure is not limited thereto. A vector parallel to a floor surface 90 may be set as a desired resistance force vector $F_{Rfd}$, and a component parallel to the floor surface 90 of the external force may be considered as $F_{ews}$, so that the task illustrated in FIG. 9 can be conducted. Further, the desired additional assist force $F_{ad}$ is calculated by using the following Equations (18) and (19), so that this can also be applied to the task illustrated in FIGS. 5A to 5C.

$$F_{ad} = K_5 \begin{bmatrix} 0 \\ 0 \\ |F_{ehs}| \\ 0 \end{bmatrix} \quad (18)$$

(in a case where the horizontal component $F_{ehs}$ of the external force is in a $+X$ direction)

$$F_{ad} = -K_5 \begin{bmatrix} 0 \\ 0 \\ |F_{ehs}| \\ 0 \end{bmatrix} \quad (19)$$

(in a case where horizontal component $F_{ehs}$ of the external force is in a $-X$ direction)

Here, $K_5$ is a constant gain, and is an adjustment parameter obtained by an experiment.

In the first to fourth embodiments, the joints of the robot arm 5 are driven by the motor 41, but the present disclosure is not limited thereto. The similar effect can be obtained by a pneumatic actuator such as a pneumatic cylinder or a pneumatic artificial muscle, in other words, an elastic body actuator.

Further, the suction pad 37 is exemplified as a member for gripping the object 38, but the present disclosure is not limited thereto, and a publicly-known gripping device such as a mechanical chuck member and an electromagnetic chuck can also be applied.

Though the present disclosure has been described above based on the above first to fourth embodiments and modifications, the present disclosure should not be limited to the above-described first to fourth embodiments and modifications. For example, the present disclosure also includes the following cases.

The above embodiments are not limited to a case where the assist force is controlled so that the horizontal component of the resistance force becomes 0. The assist force may be controlled so that the friction caused by the contact between the gripped object and the external environment does not exceed a maximum static frictional force.

Each of the above-described control apparatuses is actually a computer system that includes, for example, a microprocessor, ROM, RAM, hard disk unit, display unit, keyboard, mouse, and the like. A computer program is stored on the RAM or the hard disk unit. Functions of each apparatus can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the control apparatus according to each of the above-mentioned embodiments or modifications is a following program. That is, such a program is a control program for a robot having a multi-joint robot arm, the control program causing a computer to function as:

an impedance controller that performs impedance control on the multi-joint robot arm based on a manipulation force from a person which is acquired by a manipulation force acquiring unit disposed on the multi-joint robot arm and a set impedance parameter;

a resistance force acquiring unit disposed on the multi-joint robot arm, that acquires a resistance force generated by friction caused by contact between a gripped object and an external environment when a motion of raising the gripped object is conducted with one side of the gripped object with respect to the external environment as a rotation center while the contact between the gripped object gripped by the multi-joint robot arm and the external environment is maintained; and an assist force correcting unit that corrects a force component vertical to a horizontal component of the resistance force of an assist force generated by the impedance controller according to the resistance force so that the friction force caused by the contact between the gripped object and the external environment does not exceed a maximum static friction force when the motion of raising the gripped object is conducted.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment (s) or modification(s) of the aforementioned various embodiments and modifications, the effects possessed by the embodiment (s) or modification(s) can be produced.

The robot, the robot control apparatus, the robot control method, and the robot control program of the present disclosure enable the motions according to the resistance force caused by the friction generated by the contact, and are useful as a robot, a robot control apparatus, a robot control method, and a control program for controlling a motion of conveying an object.

The entire disclosure of Japanese Patent Application No. 2012-117370 filed on May 23, 2012, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A control apparatus for a robot having a multi-joint robot arm, the control apparatus comprising:
   a manipulation force acquiring unit disposed on the multi-joint robot arm, that acquires a manipulation force from a person;
   a resistance force acquiring unit disposed on the multi-joint robot arm, that acquires a resistance force generated by friction caused by contact between a gripped object and an external environment when a motion of raising the gripped object is conducted with one side of the gripped object with respect to the external environment as a rotation center while the contact between the gripped object gripped by the multi-joint robot arm and the external environment is maintained;
   an impedance controller that performs impedance control on the multi-joint robot arm based on the manipulation force acquired by the manipulation force acquiring unit and a set impedance parameter; and
   an assist force correcting unit that corrects a force component vertical to a horizontal component of the resistance force of an assist force generated by the impedance controller according to the resistance force acquired by the resistance force acquiring unit so that a friction force caused by the contact between the gripped object and the external environment does not exceed a maximum static friction force when the motion of raising the gripped object is conducted.

2. A control apparatus for a robot having a multi-joint robot arm, the control apparatus comprising:
   a manipulation force acquiring unit disposed on the multi-joint robot arm, that acquires a manipulation force from a person;
   a resistance force acquiring unit disposed on the multi-joint robot arm, that acquires a resistance force generated by friction caused by contact between a gripped object and an external environment when a normal force from the external environment is reduced and a motion of conveying the gripped object along a surface of the external environment is conducted so as to drag the gripped object in contact with the external environment while the contact between the gripped object gripped by the multi-joint robot arm and the external environment is maintained;
   an impedance controller that performs impedance control on the multi-joint robot arm based on the manipulation force acquired by the manipulation force acquiring unit and a set impedance parameter; and
   an assist force correcting unit that corrects a force component vertical to a horizontal component of the resistance force or a component parallel to a wall surface of an assist force generated by the impedance controller according to the resistance force acquired by the resistance force acquiring unit, so that the horizontal component of the resistance force or the component parallel to the wall surface becomes a desired resistance force vector when the motion of dragging the gripped object is conducted.

3. The control apparatus for a robot according to claim 1, wherein
   the assist force correcting unit comprises
      a direction controller that determines whether the force component vertical to the resistance force of the assist force is corrected in an increase direction or in a decrease direction according to a direction of the resistance force, and
      a calculator that determines a correcting amount of the force component vertical to the resistance force of the assist force in proportion to magnitude of the resistance force based on the direction determined by the direction controller.

4. The control apparatus for a robot according to claim 2, wherein the assist force correcting unit increases the force component vertical to the resistance force of the assist force generated by the impedance controller in proportion to magnitude of the resistance force.

5. The control apparatus for a robot according to claim 2, wherein the assist force correcting unit decreases the force component vertical to the resistance force of the assist force generated by the impedance controller in proportion to magnitude of the resistance force.

6. The control apparatus for a robot according to claim 1, wherein the assist force correcting unit corrects a force from gravity compensation of the gripped object as the force component vertical to the resistance force of the assist force generated by the impedance controller.

7. The control apparatus for a robot according to claim 5, wherein the assist force correcting unit corrects a force from force control for pressing the gripped object against the external environment as the force component vertical to the resistance force of the assist force generated by the impedance controller.

8. The control apparatus for a robot according to claim 1, wherein the resistance force acquiring unit is a force sensor disposed between an arm tip portion of the multi-joint robot arm and the gripped object gripped by the multi-joint robot arm.

9. The control apparatus for a robot according to claim 1, wherein the resistance force acquiring unit is an external force estimating unit that estimates a torque generated on a joint of the multi-joint robot arm as a torque estimation value to acquire a resistance force based on the torque estimation value and the manipulation force acquired by the manipulation force acquiring unit.

10. A robot comprising:
    a multi-joint robot arm; and
    the control apparatus according to claim 1, for controlling the robot.

11. A control method for controlling a robot having a multi-joint robot arm, the control method comprising:
    acquiring a manipulation force from a person by a manipulation force acquiring unit disposed on the multi-joint robot arm;
    acquiring a resistance force generated by friction caused by contact between a gripped object and an external environment by a resistance force acquiring unit disposed on the multi-joint robot arm when a motion of raising the gripped object is conducted with one side of the gripped object with respect to the external environment as a rotation center while the contact between the gripped object gripped by the multi-joint robot arm and the external environment is maintained;
    performing impedance control on the multi-joint robot arm by an impedance controller based on the manipulation force acquired by the manipulation force acquiring unit and a set impedance parameter; and
    correcting, by an assist force correcting unit, a force component vertical to a horizontal component of the resistance force of an assist force generated by the impedance controller according to the resistance force acquired by the resistance force acquiring unit so that the friction force caused by the contact between the gripped object and the external environment does not exceed a maximum static friction force when the motion of raising the gripped object is conducted.

12. A non-transitory computer-readable recording medium including a control program for a robot having a multi-joint robot arm, the control program causing a computer to function as:
- an impedance controller that performs impedance control on the multi-joint robot arm based on a manipulation force from a person which is acquired by a manipulation force acquiring unit disposed on the multi-joint robot arm and a set impedance parameter;
- a resistance force acquiring unit disposed on the multi-joint robot arm, that acquires a resistance force generated by friction caused by contact between a gripped object and an external environment when a motion of raising the gripped object is conducted with one side of the gripped object with respect to the external environment as a rotation center while the contact between the gripped object gripped by the multi-joint robot arm and the external environment is maintained; and
- an assist force correcting unit that corrects a force component vertical to a horizontal component of the resistance force of an assist force generated by the impedance controller according to the resistance force so that the friction force caused by the contact between the gripped object and the external environment does not exceed a maximum static friction force when the motion of raising the gripped object is conducted.

* * * * *